(12) United States Patent
Jeon et al.

(10) Patent No.: US 6,549,791 B1
(45) Date of Patent: Apr. 15, 2003

(54) WATCH TYPE PORTABLE RADIOTELEPHONE

(75) Inventors: Yong-Woo Jeon, Kyongsangbuk-do (KR); Jae-Wook Kim, Taegu-Kwangyok-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/436,101

(22) Filed: Nov. 8, 1999

(30) Foreign Application Priority Data

| Nov. 6, 1998 | (KR) | ............................................. | 98-47596 |
| Nov. 28, 1998 | (KR) | ............................................. | 98-51621 |
| Nov. 28, 1998 | (KR) | ............................................. | 98-51622 |
| Nov. 28, 1998 | (KR) | ............................................. | 98-51623 |
| Nov. 28, 1998 | (KR) | ............................................. | 98-51624 |
| Sep. 22, 1999 | (KR) | ............................................. | 99-41178 |

(51) Int. Cl.[7] .............................. H04B 1/38; H04B 1/08
(52) U.S. Cl. ..................... 455/572; 455/90; 455/556; 455/349; 455/344; 379/433.1; 379/433.08; 379/433.13
(58) Field of Search ....................... 439/165; 379/433.1, 379/433.13, 433.08, 428.01, 433.11, 433.12, 434; 320/116; 455/572, 571, 90, 575, 550, 74, 556, 344, 347, 348, 349

(56) References Cited

U.S. PATENT DOCUMENTS 5,628,089 A    5/1997   Wilcox et al.
5,629,979 A    5/1997   Domoleczny
5,819,183 A  * 10/1998  Voroba et al. .............. 455/550
5,926,545 A  *  7/1999  Wu ........................ 379/433.08
5,960,366 A  *  9/1999  Duwaer ..................... 455/556
5,995,373 A  * 11/1999  Nagai ........................ 361/755
6,035,035 A  *  3/2000  Firooz ..................... 379/433.1
6,091,965 A  *  7/2000  Voroba et al. .............. 455/550
6,192,253 B1 *  2/2001  Charlier et al. ............. 455/550
6,459,890 B1 * 10/2002  Kim .......................... 455/556
D466,488 S   * 12/2002  Wada et al. ................ D14/138
D466,879 S   * 12/2002  Wada et al. ................ D14/138

FOREIGN PATENT DOCUMENTS

WO          WO 9827702       6/1998

OTHER PUBLICATIONS

Japanese Abstract JP 9055679.

* cited by examiner

*Primary Examiner*—Tracy Legree
(74) *Attorney, Agent, or Firm*—Dilworth & Barrese, LLP

(57) ABSTRACT

A watch type portable radiotelephone is disclosed. The watch type portable radiotelephone includes a body element having upper and lower case frames; a battery pack holder including a battery pack for supplying power to the body element; a locking device for locking and unlocking the battery pack to and from the battery pack holder, respectively; a hinge connector for rotatably connecting the body element and the battery pack holder to each other; and a wrist band connected to the body element and the battery pack holder for enabling the portable radiotelephone to be worn around the wrist.

28 Claims, 24 Drawing Sheets

WATCH TYPE PORTABLE RADIOTELEPHONE

BACKGROUND OF THE INVENTION

1. Field of the Invention

The present invention relates to a portable radiotelephone, and more particularly, the present invention relates to a watch type portable radiotelephone which can be worn around the wrist.

2. Description of the Related Art

Generally, portable radiotelephones include hand-held programming (HHP) devices, second generation cordless telephones S(CT-2), analog type or digital type cellular phones, personal communication system (PCS) phones, etc. Such portable radiotelephones perform a communication function while conducting radio communications with a base station. Currently, development of such portable radiotelephones is focused on providing high sensitivity, compactness and lightness.

Portable radiotelephones can be classified, in terms of external construction, into a first generation having a bar type construction and a second generation having a flip type construction. The flip type portable radiotelephones and third generation folder type portable radiotelephones are widely used. In the future, the tendency toward the use of folder type portable radiotelephones or portable terminals having a more compact construction will be increased.

A conventional bar type portable radiotelephone comprises a body element, an antenna unit which is installed at an upper end of the body element, an earpiece which is located below the antenna unit and includes a speaker, an LCD unit which is installed below the earpiece, a key pad which is located below the LCD unit and includes a multitude of number keys and function keys, and a microphone unit which is located below the key pad.

A conventional flip type portable radiotelephone (as disclosed in U.S. Pat. No. 5,629,979) comprises a body element, a flip element, and a hinge unit for connecting the body element and the flip element with each other. In the conventional flip type portable radiotelephone, an antenna unit is installed at an upper end of the body element, an earpiece including a speaker is located below the A antenna unit, an LCD unit is mounted below the earpiece, a key pad including a multitude of number keys and function keys is disposed below the LCD unit, and a microphone unit is mounted below the key pad. The microphone unit can be installed at the flip element, as occasion demands.

A conventional folder type portable radiotelephone (as disclosed in U.S. Pat. No. 5,628,089) comprises a body element, a folder, and a hinge unit for rotating the folder at one end of the body element by an angle capable of rendering communication. In the conventional folder type portable radiotelephone, an antenna unit is installed at an upper end of the body element, a key pad including a multitude of number keys and function keys is disposed below the antenna unit, and a microphone unit is mounted below the key pad. An earpiece including a speaker is located at an upper end of the folder which is opened and closed by the hinge unit, and an LCD unit is mounted below the earpiece. At this time, the hinge unit which facilitates opening and closing of the folder with respect to the body element, performs a function of electrically as well as mechanically connecting the body element and the folder with each other.

Among the bar type, flip type and folder type portable radiotelephones, the flip type and the folder type portable radiotelephones, which provide excellent sound sensitivity levels, are used increasingly.

The use of the flip type portable radiotelephones is currently increasing because the flip element coupled to the body element serves a standby mode of protecting the multitude of keys provided on the body element and thereby preventing erroneous operation of those keys. Moreover, in a talking mode, the flip element serves as a reflecting plate for concentrating sound during speaking to enhance the sound sensitivity level. In addition, the flip type construction is advantageous in terms of compactness of the body element in that the microphone unit can be installed on the flip cover.

Similarly to the flip type construction, the use of folder type portable radiotelephones is currently increasing because the folder coupled to the body element serves a standby mode of protecting a key pad provided on the body element to prevent erroneous operation of the multitude of keys. Moreover, in a talking mode, the folder serves as a reflecting plate for concentrating sound during speaking to enhance the sound sensitivity level. In addition, the folder type construction is advantageous in terms of compactness of the body element in that the speaker unit and the LCD unit can be installed on the folder.

At this time, while the trend in portable radiotelephones is currently toward the miniaturization thereof, there exists a limit in miniaturizing portable radiotelephones because a minimum distance must be secured between the ear and the mouth of a user. In other words, a distance over 14 cm must be secured between a talking section of a portable radiotelephone (where a microphone is installed) and a hearing section (where an earpiece including a speaker is located) of the portable radiotelephone. Accordingly, flip type and folder type portable radiotelephones can only be miniaturized while maintaining an adequate total length.

Therefore, in the conventional bar type, flip type or folder type portable radiotelephones, strict limits exist in miniaturization. Hence, conventional portable radiotelephones suffer from defects in that portability thereof is deteriorated. Further, while it is the norm to carry a radiotelephone in a pocket, separate bag, or by hand, the likelihood that a radiotelephone will become lost is remarkably increased. Also, if a radiotelephone is dropped due to careless handling or the radiotelephone is impacted, the radiotelephone is likely to be damaged and rendered useless.

Furthermore, conventional radiotelephones suffer from the problem of being unable to ensure waterproofness in a reliable manner.

SUMMARY OF THE INVENTION

Accordingly, the present invention has been made in an effort to solve the problems occurring in the related art, and an object of the present invention is to provide a watch type portable radiotelephone which is advantageous in terms of miniaturization thereof.

Another object of the present invention is to provide a watch type portable radiotelephone in which a battery pack can be mounted to or dismounted from a battery pack holder in a state wherein it is separated from a body element.

Another object of the present invention is to provide a watch type portable radiotelephone which can be worn around the wrist, thus minimizing the likelihood of its being dropped.

Another object of the present invention is to provide a watch type portable radiotelephone which has hinge means for providing increased portability when the watch type radiotelephone is worn around the wrist, thereby ensuring convenience.

Another object of the present invention is to provide a watch type portable radiotelephone which has hinge means for enabling a flexible printed circuit capable of electrically connecting a battery pack to a body element separated from a battery pack holder to be smoothly guided.

Another object of the present invention is to provide a watch type portable radiotelephone which has connection means for electrically connecting a battery pack holder separated from a body element to a battery pack.

Still another object of the present invention is to provide a watch type portable radiotelephone which has terminal connection means possessing a waterproof structure.

Yet still another object of the present invention is to provide a watch type portable radiotelephone which has locking means capable of easily locking and unlocking a battery pack to and from a battery pack holder, respectively.

In order to achieve the above objects, according to the present invention, there is provided a portable radiotelephone comprising: a body element including upper and lower case frames; a battery pack holder including a battery pack for supplying power to the body element; locking means for locking and unlocking the battery pack to and from the battery pack holder, respectively; hinge means for rotatably connecting the body element and the battery pack holder to each other; and a wrist band connected to the body element and the battery pack holder for enabling the portable radiotelephone to be worn around the wrist.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Figure 1:
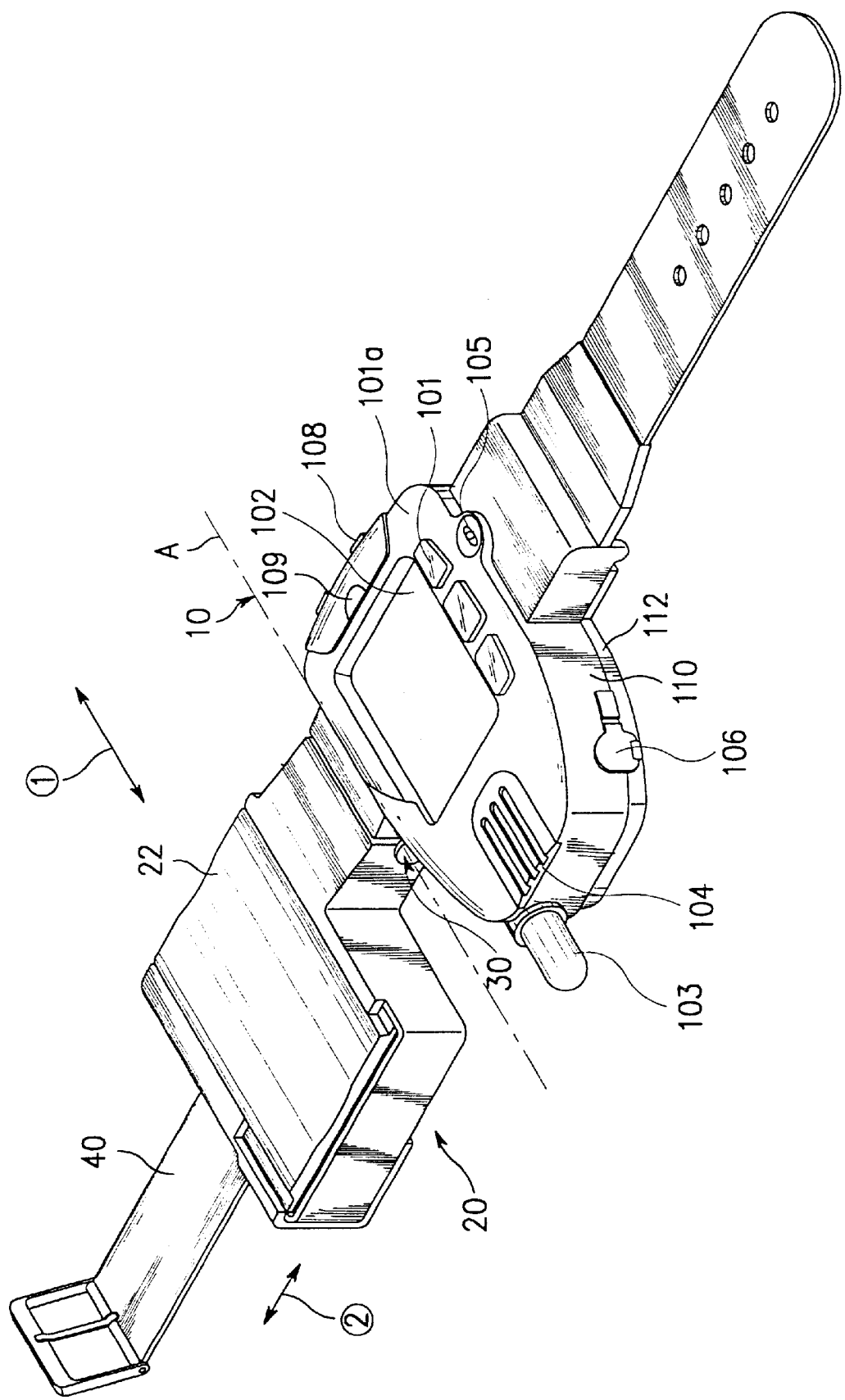
FIG. 1 is a perspective view illustrating a watch type portable radiotelephone in accordance with a preferred embodiment of the present invention.

Reference will now be made in greater detail to the preferred embodiments of the present invention, wherein the same or similar elements are denoted by the same reference numerals even though they are depicted in different drawings.

Figure 2:
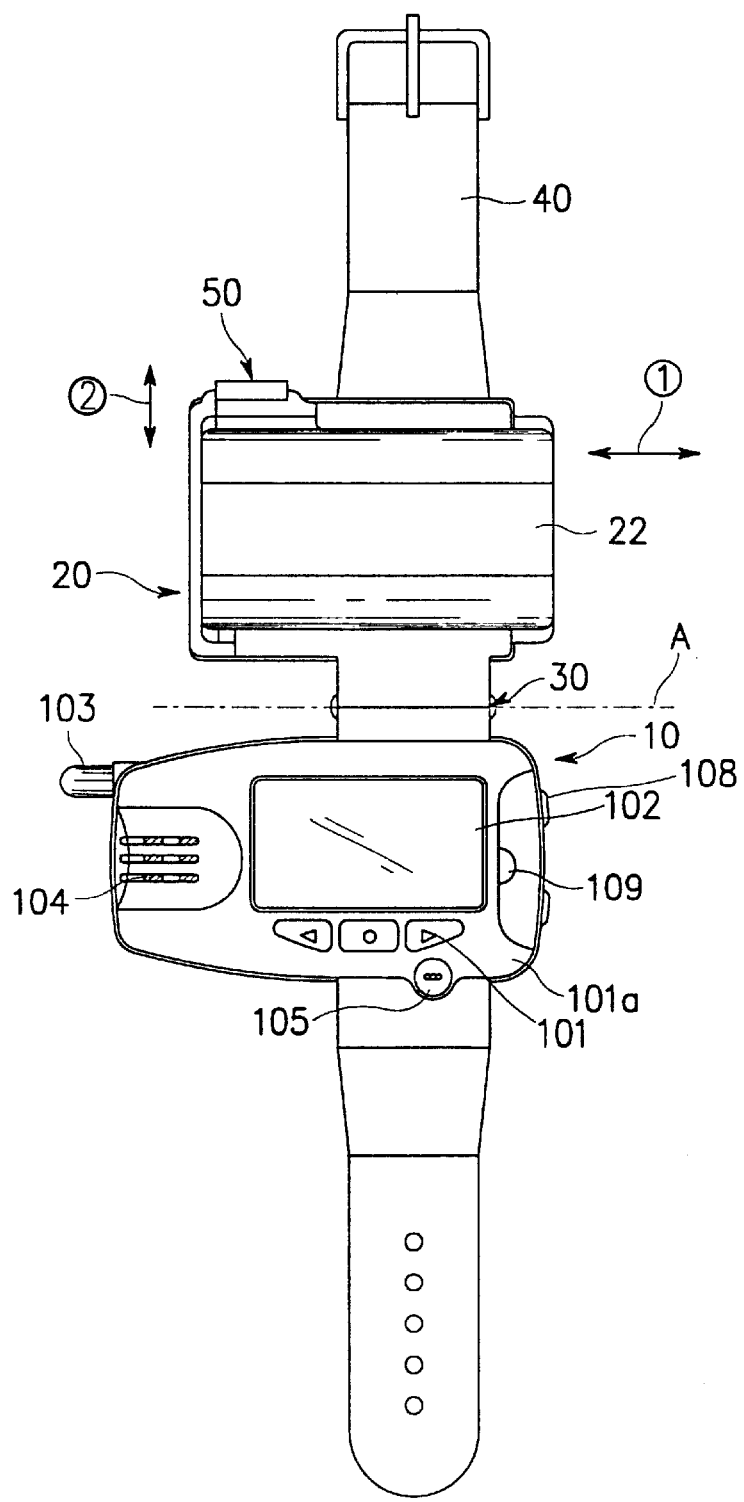
FIG. 2 is a front view illustrating the watch type portable radiotelephone shown in FIG. 1.
Figure 3:
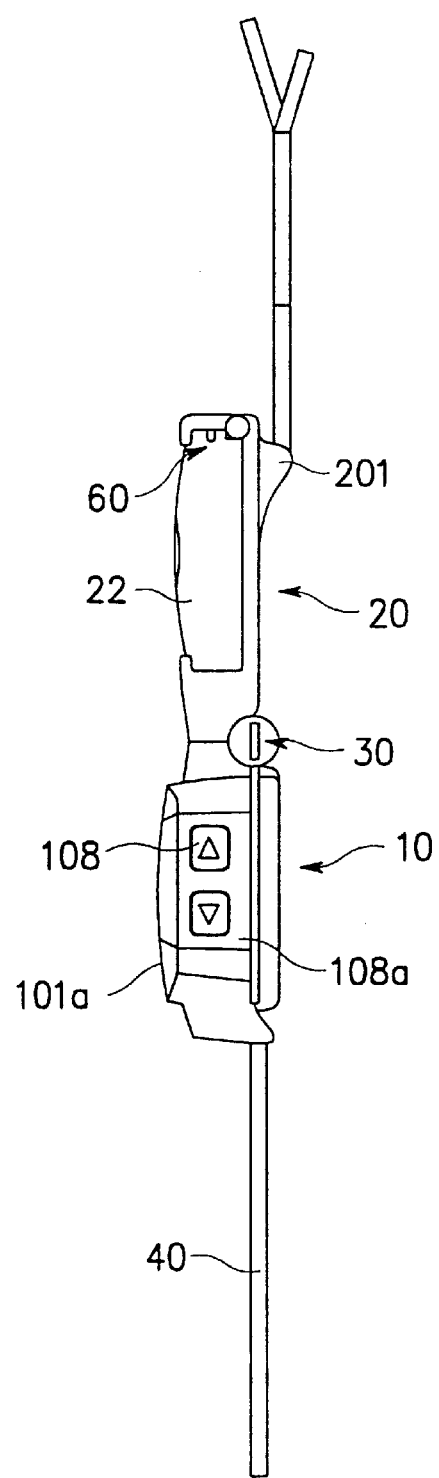
FIG. 3 is a side view illustrating the watch type portable radiotelephone shown in FIG. 1.
Figure 4:
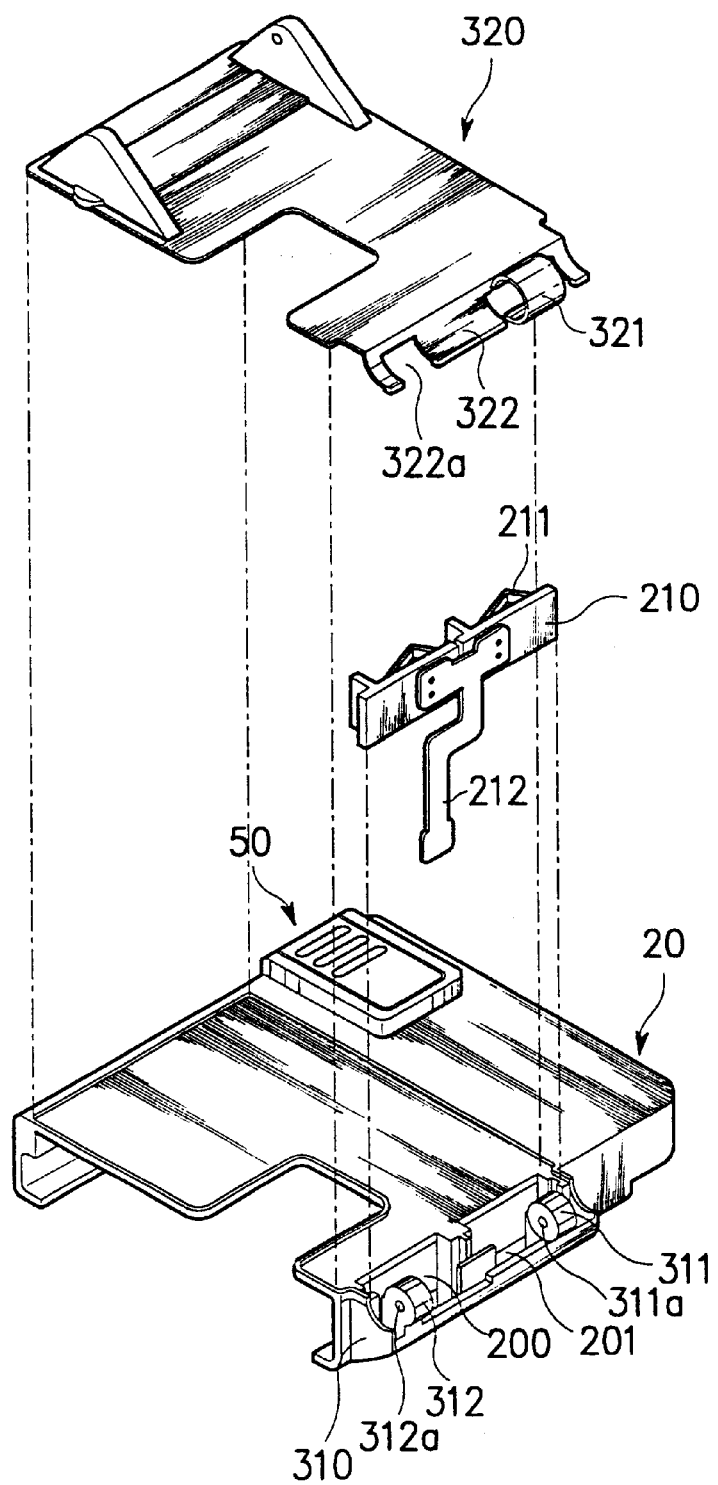
FIG. 4 is an exploded perspective view of the battery pack holder of the watch type portable radiotelephone shown in FIG. 1.
Figure 5:
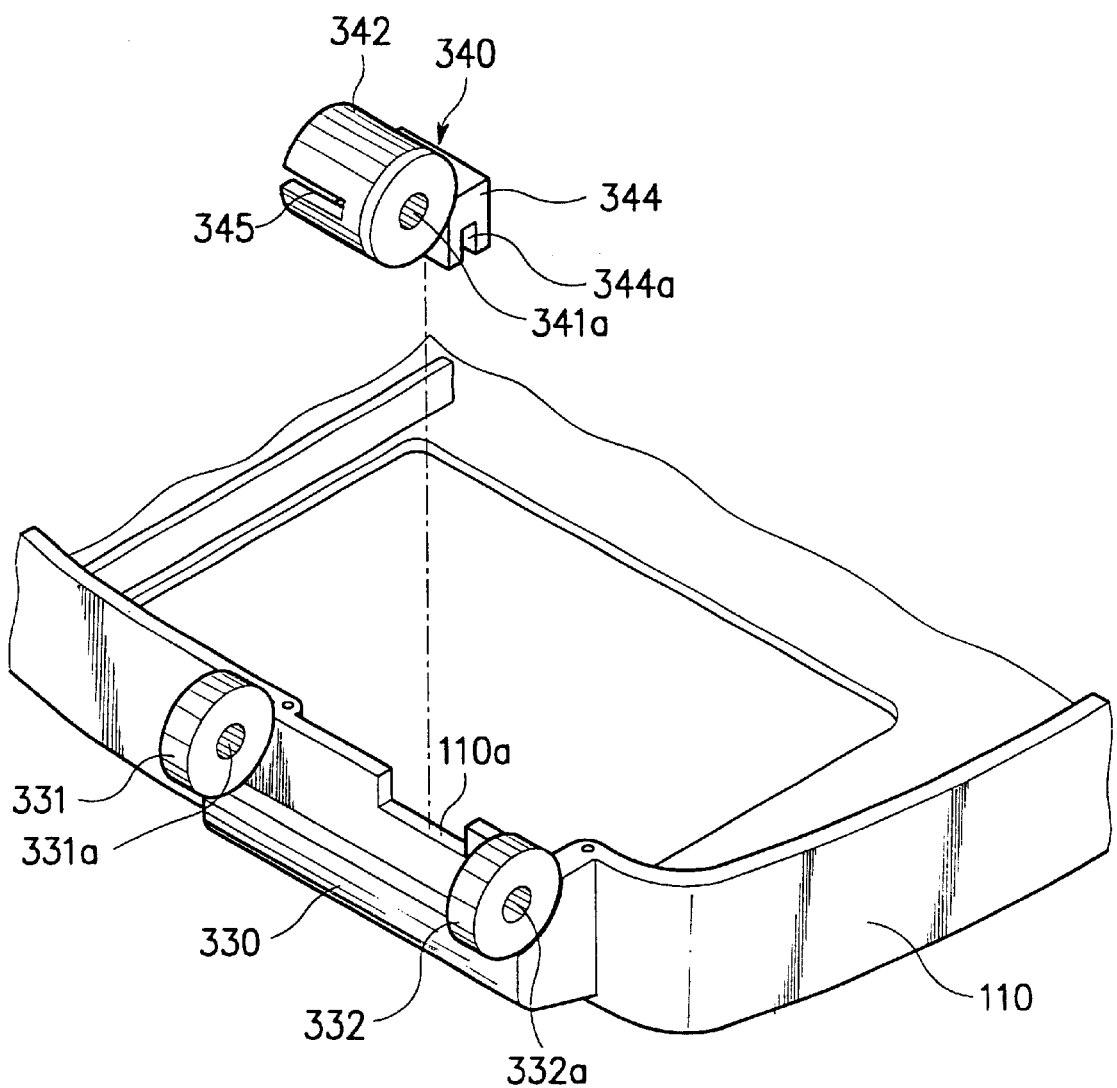
FIG. 5 is an exploded perspective view partially illustrating the hinge means of a body element of the watch type portable radiotelephone shown in FIG. 1.

Referring to FIGS. 1–3, the watch type portable radiotelephone in accordance with a preferred embodiment of the present invention is largely divided into four sections. That is, the watch type portable radiotelephone comprises a body element 10, a battery pack holder 20 to which power supply means such as a battery pack 22 is locked, locking means 50 (FIG. 2) for locking and unlocking the battery pack 22 to and from the battery pack holder 20, respectively, and hinge means 30 which rotatably connects the body element 10 and the battery pack holder 20 to each other. The watch type portable radiotelephone according to the present invention further comprises a wrist band 40 which is connected to the body element 10 and the battery pack holder 20 for enabling the watch type portable radiotelephone to be worn around the wrist.

The watch type portable radiotelephone is extraordinarily advantageous in terms of miniaturization of the body element 10, due to the fact that the battery pack 22 which serves as power supply means is not locked to the body element 10, but locked to the battery pack holder 20 which is rotatably connected to the body element 10 by the hinge means 30.

Because body element 10 and battery pack 22 are separated from each other, body element 10 and battery pack 22 are constructed in a manner such that battery pack 22 is electrically connected to a circuit board of body element 10 through separate connection means.

Wrist band 40 for enabling the watch type portable radiotelephone to be worn around the wrist is rotatably coupled at its ends to body element 10 and battery pack holder 20, respectively. To allow wrist band 40 to be connected to the body element 10 and battery pack holder 20, a pair of hinge projections 201 (FIG. 3) are formed on a lower surface of body element 10, and another pair of hinge projections 201 are formed on an outer surface of a bottom wall of battery pack holder 20. Each pair of hinge projections 201 are formed in a manner such that they are positioned opposite to each other.

Body element 10 comprises upper and lower case frames 110 and 112. Upper and lower case frames 110 and 112 are coupled to each other using screws or the like. An RF board, a voice recognition unit (not shown), a frequency modulating unit (not shown), an RF module, a receiver and a transmitter are positioned in body element 10. Body element 10 also includes data input means and data output means. While it is preferred that the data input means comprises at least one key 101, it is possible to input data through the voice recognition unit.

It is preferred that an LCD 102 which responds to an operation of the at least one key 101 is used as the data output means. A variety of display information and data can be displayed on the LCD 102 in response to operation of the data input means.

The data input means has at least one key 101 and further includes waterproofing means (not shown). In other words, the key input means is provided with waterproofing means for preventing failure in the key operation due to inflow of water from outside circumstances.

Keys are disposed on a top end 101*a* and a side end 108*a* of body element 10. A scroll key and a direction key are disposed on top end 101*a* of body element 10, and a function side key 108 is disposed on side end 108*a* of body element 10.

An antenna unit 103 which is electrically connected to a receiver (not shown) and a transmitter (not shown) is disposed in body element 10. Also, in body element 10, there are disposed a speaker unit 104 which is electrically connected to the receiver and a microphone unit 105 which is electrically connected to the transmitter. In addition, a telephone signal reception indicator lamp 109 is provided on body element 10 to allow a user to easily confirm the reception of a telephone signal. An ear microphone cover 106 is also provided on body element 10 to protect a connection part of an earphone also provided on body element 10.

Battery pack 22 for supplying power to the body element 10 is mounted to the battery pack holder 20. Battery pack 22 can be repeatedly locked and unlocked to and from the battery pack holder 20, respectively, to facilitate recharging of the battery pack. For this purpose, the battery pack holder 20 has locking means 50 (FIG. 2) for locking and unlocking the battery pack 22 to and from battery pack holder 20, respectively. Moreover, in order to electrically connect battery pack 22 to body element 10, connection means is provided between battery pack 22 and body element 10.

Body element 10 and battery pack holder 20 are mechanically connected with each other by hinge means 30, such that battery pack holder 20 can be rotated relative to body element 10 about a rotation axis A (FIG. 2).

Wrist band 40 is connected to body element 10 and battery pack holder 20, and locking segments are provided on the free ends of wrist band 40 to allow the watch type portable radiotelephone of the present invention to be easily attached to and detached from the wrist.

In the case that the battery pack 22 is mounted to the battery pack holder 20, the battery pack 22 is maintained in a locked state, and in the case that the battery pack 22 is unlocked from the battery pack holder 20, the battery pack 22 can be detached from the battery pack holder 20. In FIG. 1, an arrow ① indicates the directions in which the battery pack 22 is locked and unlocked to and from battery pack holder 20, and an arrow ② indicates the directions in which a locker of locking means 50 is moved to lock and unlock the battery pack holder.

Battery pack 22 is locked and unlocked to and from the battery pack holder 20 while being moved along a straight path in the directions indicated by arrow ①. For this, guide means 60 (FIG. 3) is provided to allow battery pack 22 to be locked and unlocked to and from the battery pack holder 20 while being moved along the straight path.

Guide means 60 comprises a guide projection and a guide groove as well known in the art. The guide projection is formed in battery pack holder 20, and the guide groove is formed on a side end of battery pack 22.

The watch type portable radiotelephone provides advantages in that since it can be worn around the wrist of the user, excellent portability is accomplished. Also, since battery pack holder 20 including battery pack 22 is mechanically and electrically connected to body element 10 by hinge means 30, the watch type portable radiotelephone is advantageous in terms of the miniaturization thereof. Moreover, because battery pack 22 can be repeatedly locked and unlocked to and from battery pack holder 20, respectively, by separate locking means 50, user convenience is ensured.

Also, by the fact that battery pack holder 20 and body element 10 are rotatably connected with each other by hinge means 30 including the electrical connection means, the watch type portable radiotelephone can be easily worn around the wrist while having enhanced portability.

Referring to FIGS. 4–7, hinge means 30 includes as its components battery pack holder 20, a lower cover 320 which is fastened to the outer surface of the bottom wall of battery pack holder 20, and body element 10 having upper and lower case frames 110 and 112.

A pair of contact spring holders 210 are arranged at a side of battery pack holder 20. The pair of contact spring holders 210 have four contact springs 211 which are brought into contact with four terminals of battery pack 22, respectively, when battery pack 22 is mounted to battery pack holder 20. A flexible printed circuit (FPC) 212 is provided on outer surfaces of the pair of contact spring holders 210. One end of flexible printed circuit 212 is electrically connected to contact springs 211 by soldering. The pair of contact spring holders 210 are installed on a pair of seating surfaces 201, respectively, defined in a first supporting part 310 which projects from the side of battery pack holder 20.

A second supporting part 330 (FIG. 5) having the same structure as first supporting part 310 formed in battery pack holder 20, is also formed in body element 10. Hinge means 30 is positioned between first and second supporting parts 310 and 330 to couple them to each other.

A first hinge arm 311 and a second hinge arm 312 are formed on first supporting part 310 of battery pack holder 20 in a manner such that they are spaced apart from each other by a predetermined distance. First and second hinge arms 311 and 312 are formed with hinge holes 311a and 312a, respectively, through which a hinge shaft having a predetermined contour can pass.

A third hinge arm 321 is formed at a side of lower cover 320 which is fastened to the outer surface of the bottom wall of battery pack holder 20. Third hinge arm 321 is formed having an opening defined on an inside thereof. Third hinge arm 321 functions to guide the other end of the flexible printed circuit 212 therethrough, toward the body element 10. Body element 10 has one end fastened to the pair of contact spring holders 210. Third hinge arm 321 is positioned in close contact at one end thereof with one end of first hinge arm 311 of battery pack holder 20 when lower cover 320 is fastened to battery pack holder 20. A supporting part cover portion 322 which covers the first supporting part 310 of battery pack holder 20 is formed at both sides of third hinge arm 321 of lower cover 320. A pair of open portions 322a are formed in the supporting part cover portion 322 above first and second hinge arms 311 and 312 to prevent supporting part cover portion 322 from being interfered with by first and second hinge arms 311 and 312 when it is mounted to battery pack holder 20.

A fourth hinge arm 331 and a fifth hinge arm 332 project from opposite ends of second supporting part 330, respectively, which is positioned in upper case frame 110 of body element 10. Fourth and fifth hinge arms 331 and 332 are formed with hinge holes 331a and 332a, respectively. A separate center hinge arm 340 is disposed at the upper case frame 110 between fourth and fifth hinge arms 331 and 332.

Figure 6:
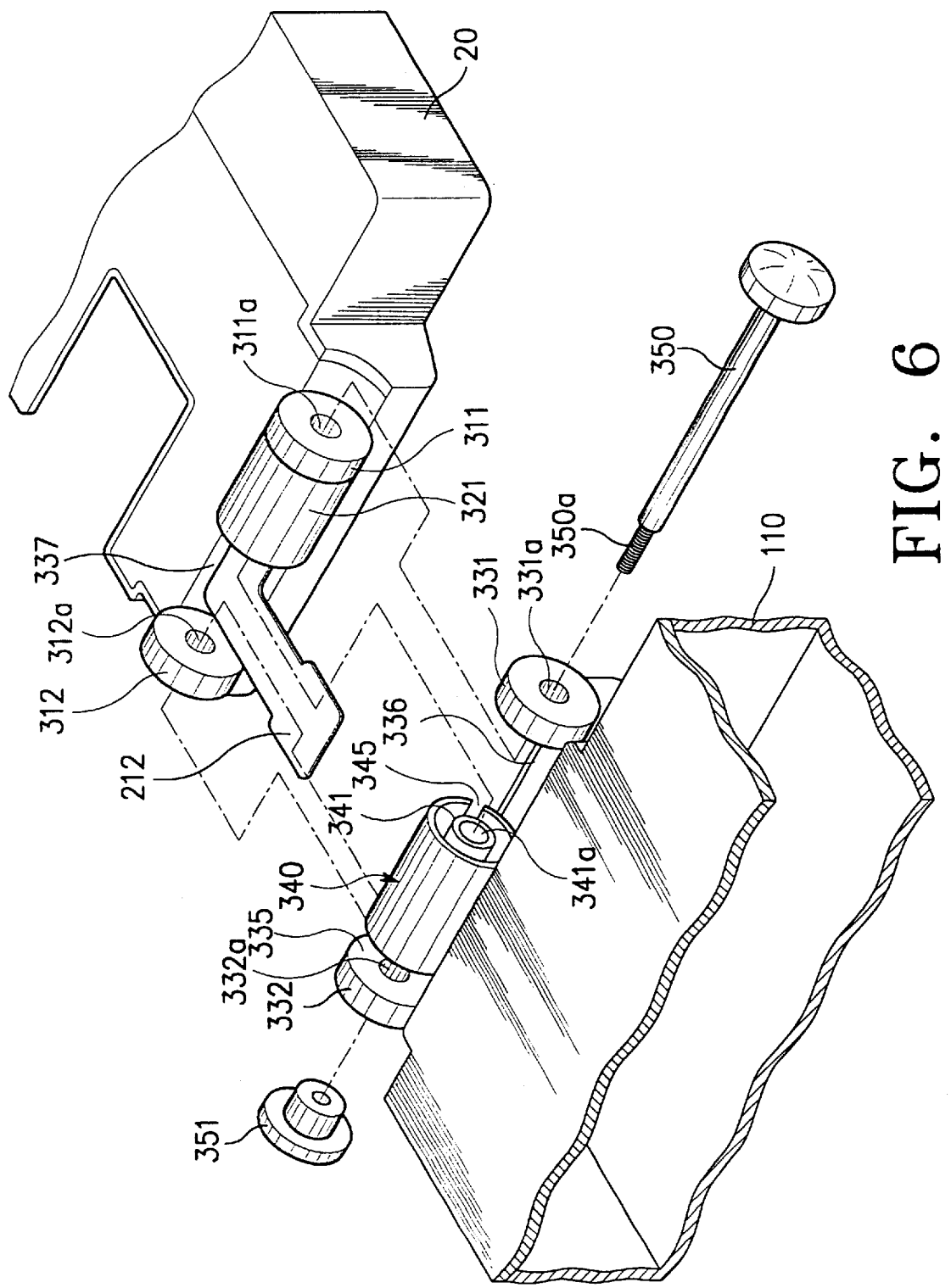
FIG. 6 is an exploded perspective view illustrating the hinge means of the watch type portable radiotelephone shown in FIG. 1.
Figure 7:
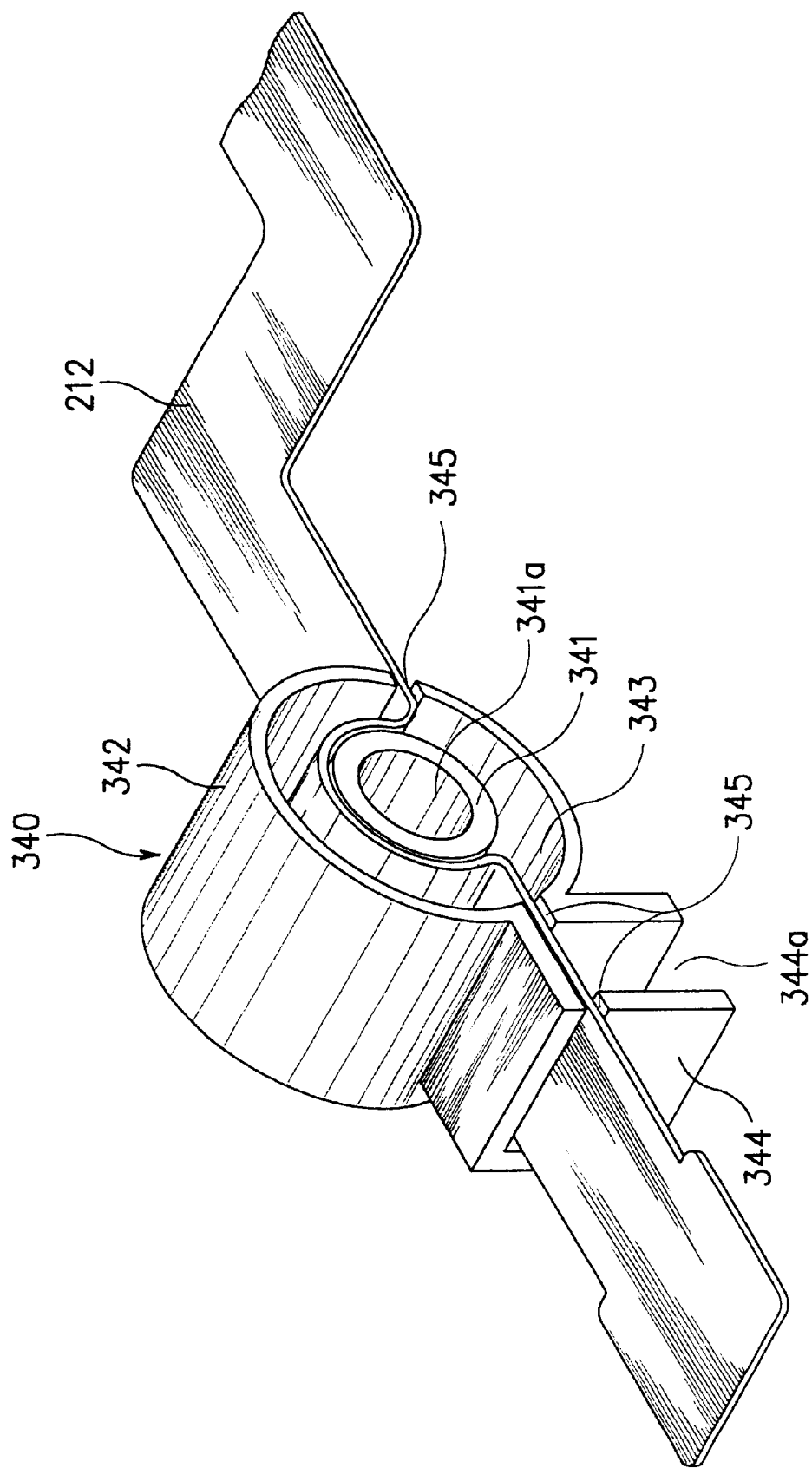
FIG. 7 is a partial perspective view illustrating a state wherein a flexible printed circuit of the watch type portable radiotelephone shown in FIG. 1 is inserted into a center hinge arm of the body element.

Center hinge arm 340 has, as shown in FIG. 6, an inner hinge arm portion 341 which defines a hinge hole 341a and an outer housing 342 which defines an annular space 343 (see FIG. 7) around inner hinge arm portion 341. Inner hinge arm portion 341 and outer housing 343 are concentrically arranged about hinge hole 341 a, and are formed integrally with each other. A first axially extending slit 345, through which flexible printed circuit 212 passes, is formed in outer housing 342. A body element mounting part 344 having a pair of second slits 345a through which flexible printed circuit 212 also, passes and a first seating groove 344a which is defined between the pair of second slits 345a, is formed integrally with a side of center hinge arm 340.

A mounting edge portion 110a is formed in upper case frame 110 of body element 10 in a manner such that mounting edge portion 110a has a height which is smaller than that of upper case frame 110 of body element 10. Mounting edge portion 110a is fitted into first seating groove 344a of body element mounting part 344.

If lower cover 320, which includes third hinge arm 321 formed therein, is assembled to the outer surface of the bottom wall of battery pack holder 20 by means of screws (not shown) etc., third hinge arm 321 is brought into close contact at one end thereof with the one end of first hinge arm 311 of battery pack holder 20. Supporting part cover portion 322 of lower cover 320 covers first support part 310 of battery pack holder 20. At this time, flexible printed circuit 212 is guided through the opened portion of third hinge arm 321.

In order to couple battery pack holder 20, to which the lower cover 320 is mounted, to body element 10, first and second supporting parts 310 and 330 are oppositely positioned. At this time, second hinge arm 312 of battery pack holder 20 is substantially closely fitted into a first slot 335 which is defined between center hinge arm 340 and fifth hinge arm 332 of upper case frame 110. First hinge arm 311 of battery pack holder 20 and third hinge arm 321 of lower cover 320, which is brought into contact at its one end with the one end of the first hinge arm 311, are substantially closely fitted into a second slot 336 which is defined between fourth hinge arm 331 and center hinge arm 340 of upper case frame 110 of body element 10. In other words, all of the hinge arms are aligned and brought into close contact with the other hinge arms in the order of fourth hinge arm 331, first hinge arm 311, third hinge arm 321, center hinge arm 340, second hinge arm 312 and fifth hinge arm 332. In addition, hinge holes of the respective hinge arms are aligned one with another to allow hinge shaft 350 to be inserted therein.

At this time, the other end of flexible printed circuit 212 which is guided through third hinge arm 321, as shown in FIG. 6, passes through the first slit 345, which is defined in outer housing 342 of center hinge arm 340, and then, is detoured along annular space 343, which is defined between inner hinge arm portion 341 and outer housing 342 of center hinge arm 340. Thereafter, flexible printed circuit 212 is introduced into body element 10 after passing through the pairs of second slits 345a of body element mounting part 344. Flexible printed circuit 212 is detoured along annular space 343 to prevent flexible printed circuit 212 from being pulled tightly when battery pack holder 20 is pivoted relative to body element 10 over a predetermined angle. Accordingly, flexible printed circuit 212 is detoured in a direction where battery pack holder 20 is pivoted relative to body element 10.

By inserting hinge shaft 350 through the respective hinge holes which are formed in the respective hinge arms, body element 10 and battery pack holder 20 are coupled to each other. A threaded portion 350a is formed at a distal end of hinge shaft 350. After hinge shaft 350 is passed through the hinge holes, a hinge cap 351 is secured to threaded portion 350a of hinge shaft 350. Assembling operations between body element 10 and battery pack holder 20 are completed.

As described above, because body element 10 and battery pack 22 are mounted in a state wherein they are separated from each other, battery pack 22 is electrically connected to the board of body element 10 by separate connection means. Namely, electrical connection means are provided between body element 10 and battery pack holder 20. In this connection, electrical contacting means is provided between battery pack 22 and battery pack holder 20, to allow them to be brought into contact with each other when battery pack 22 is locked to battery pack holder 20.

Figure 8:
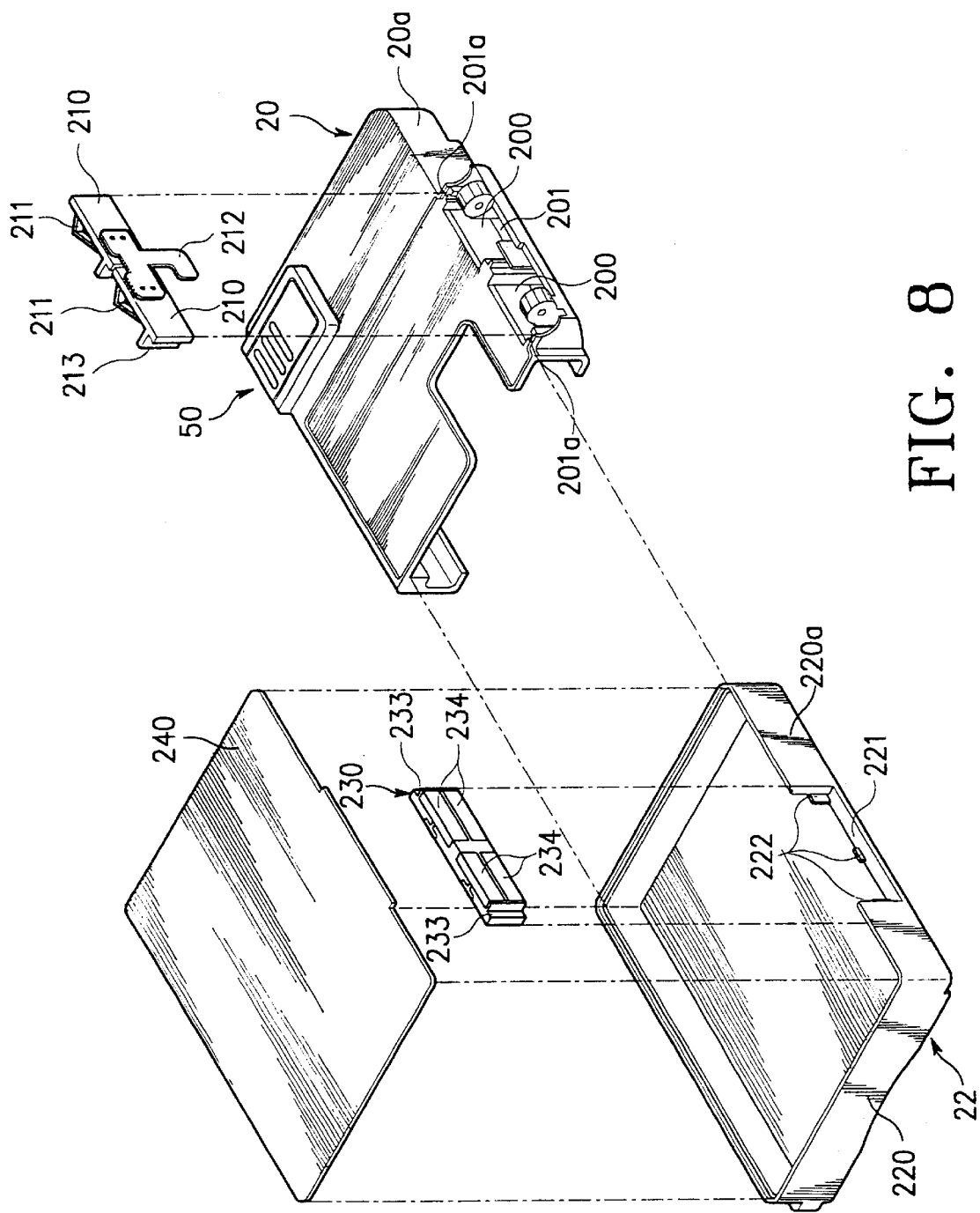
FIG. 8 is an exploded perspective view illustrating connection means for battery pack terminals of the watch type portable radiotelephone shown in FIG. 1.
Figure 9:
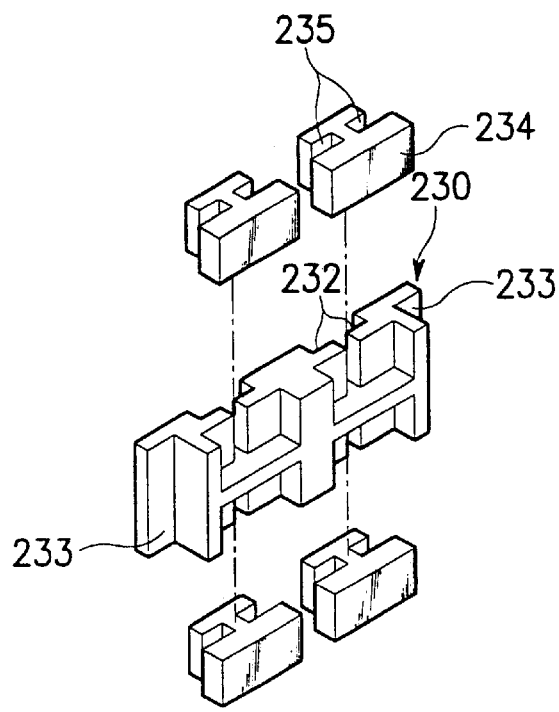
FIG. 9 is an exploded perspective view illustrating a construction of a terminal holder of a battery pack of the watch type portable radiotelephone shown in FIG. 1.
Figure 10:
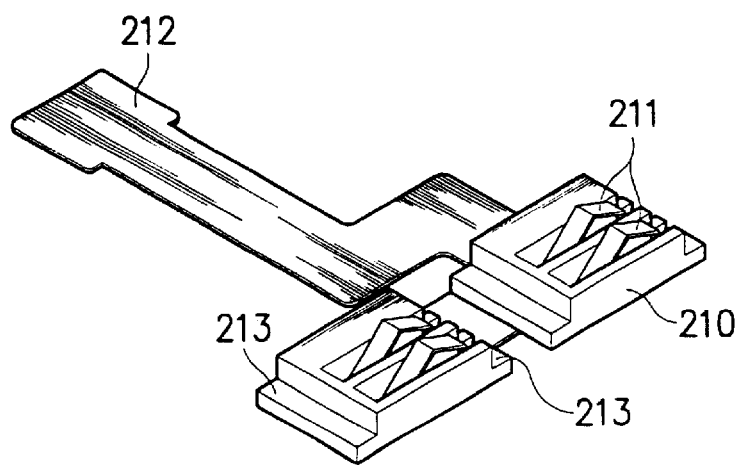
FIG. 10 is a perspective view of a pair of contact spring holders of the watch type portable radiotelephone shown in FIG. 1 to which four contact springs are mounted.

Referring to FIGS. 8–10, battery pack 22 comprises a case 220 into which a plurality of battery cells (not shown) are embedded, a terminal holder 230 having four terminals 234 which are installed on a side wall 220a of the case 220, and a cover 240 which is secured to case 220 after the plurality of battery cells and terminal holder 230 are embedded into and installed in case 220, respectively.

Side wall 220a of case 220 is formed with a seating edge portion 221. Seating edge portion 221 is formed by a cutaway portion formed in side wall 220a of case 220. Seating edge portion 221 allows terminal holder 230 to be seated thereon. Three guide pieces 222 are formed at both left and right ends and at a center of seating edge portion 221 of battery pack 22, respectively, in a manner such that they project upward. A pair of first stepped portions 233 are formed at both ends of terminal holder 230, respectively, in such a manner that they can be tightly fitted between the three guide pieces 222 and the outer surface of side wall 220a of case 220 of battery pack 22.

Two pairs of guide ribs 232 (FIG. 9) are formed at each of upper and lower portions of terminal holder 230, and a pair of guide grooves 235 are formed at both sides of each terminal 234, respectively, which is installed on terminal holder 230. Each pair of guide ribs 232 of terminal holder 230 are tightly fitted into the pair of guide grooves 235 of each terminal 234, respectively. An inner surface of terminal 234, which is coupled to terminal holder 230, is electrically connected to the plurality of battery cells, and an outer surface of terminal 234 is positioned flush with outer surface of side wall 220a of case 220. Cover 240 is attached to an upper end of case 220 by means of ultrasonic fusion welding to achieve a waterproof structure.

A pair of openings 200 are defined at positions which correspond to the two pairs of terminals 234 of the terminal holder 230, respectively, which are exposed to the outside through side wall 220a of case 220 of battery pack 22. A pair of seating surfaces 201 are defined at lower ends of the pair of openings 200, respectively. The pair of contact spring holders 210, to which four contact springs 211 are installed, are seated on the pair of seating surfaces 201, respectively. Contact springs 211 are formed such that portions thereof project into battery pack holder 20 such that they can be brought into contact with terminals 234 of battery pack 22 when battery pack 22 is mounted to battery pack holder 20.

A pair of second seating grooves 201a having a predetermined depth are formed in a longitudinal direction at the sides of the pair of seating surfaces 201 of battery pack holder 20, respectively. Ends of the pair of contact spring holders 210 are tightly fitted into the pair of second seating grooves 201a, respectively. Proximal ends of contact springs 211 project toward the outer surfaces of the pair of contact spring holders 210, to facilitate connection to the other end of flexible printed circuit 212, which in turn is electrically connected to body element 10. As described above, lower cover 320, which is formed with the pair of hinge projections for securing the wrist band 40, is fastened to the outer surface of the bottom wall of battery pack holder 20.

Figure 11:
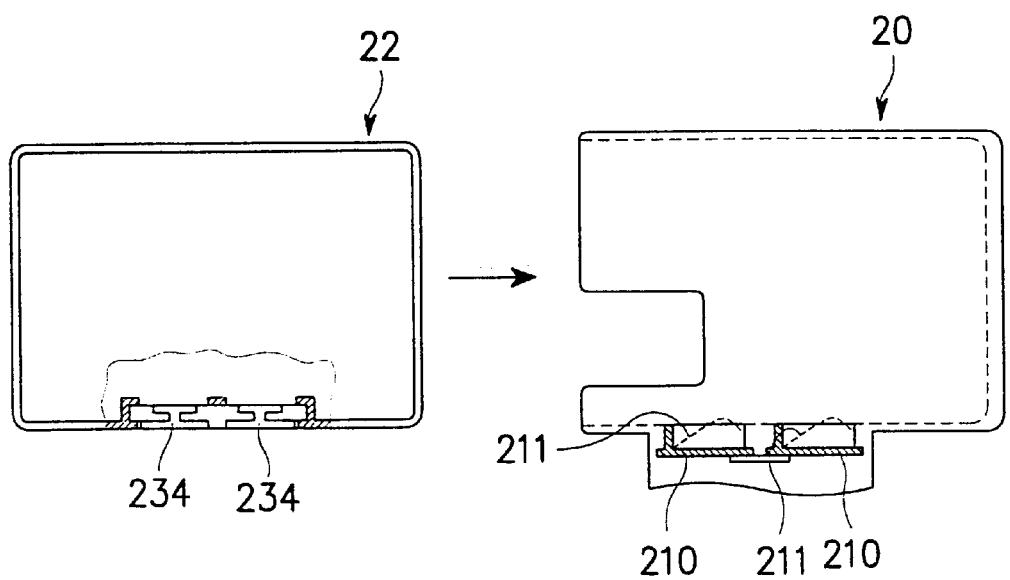
FIG. 11 is a partially cross-sectioned view illustrating a state just before the battery pack of the watch type portable radiotelephone shown in FIG. 1 is mounted to the battery pack holder.
Figure 12:
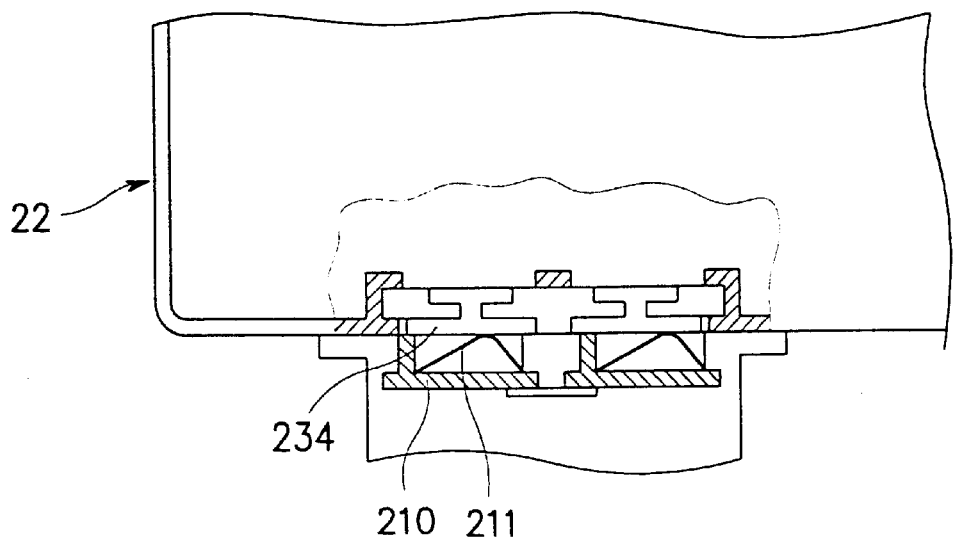
FIG. 12 is a partially cross-sectioned view illustrating another state wherein the battery pack of the watch type portable radiotelephone shown in FIG. 1 is mounted to the battery pack holder.

Referring to FIGS. 11 and 12, when battery pack 22 is mounted to battery pack holder 20, the four terminals 234, which are exposed to the outside through side wall 220a of case 220 of battery pack 22, are brought into contact with the four contact springs 211, the portions of which project into battery pack holder 20. At this time, contact springs 211, which are mounted to the battery pack holder 20, are pressed by terminals 234 of battery pack 22 and urged backward by a predetermined tension. As a result, terminals 234 of battery pack 22 and contact springs 211 of battery pack holder 20 are in close contact with one another.

Figure 13:
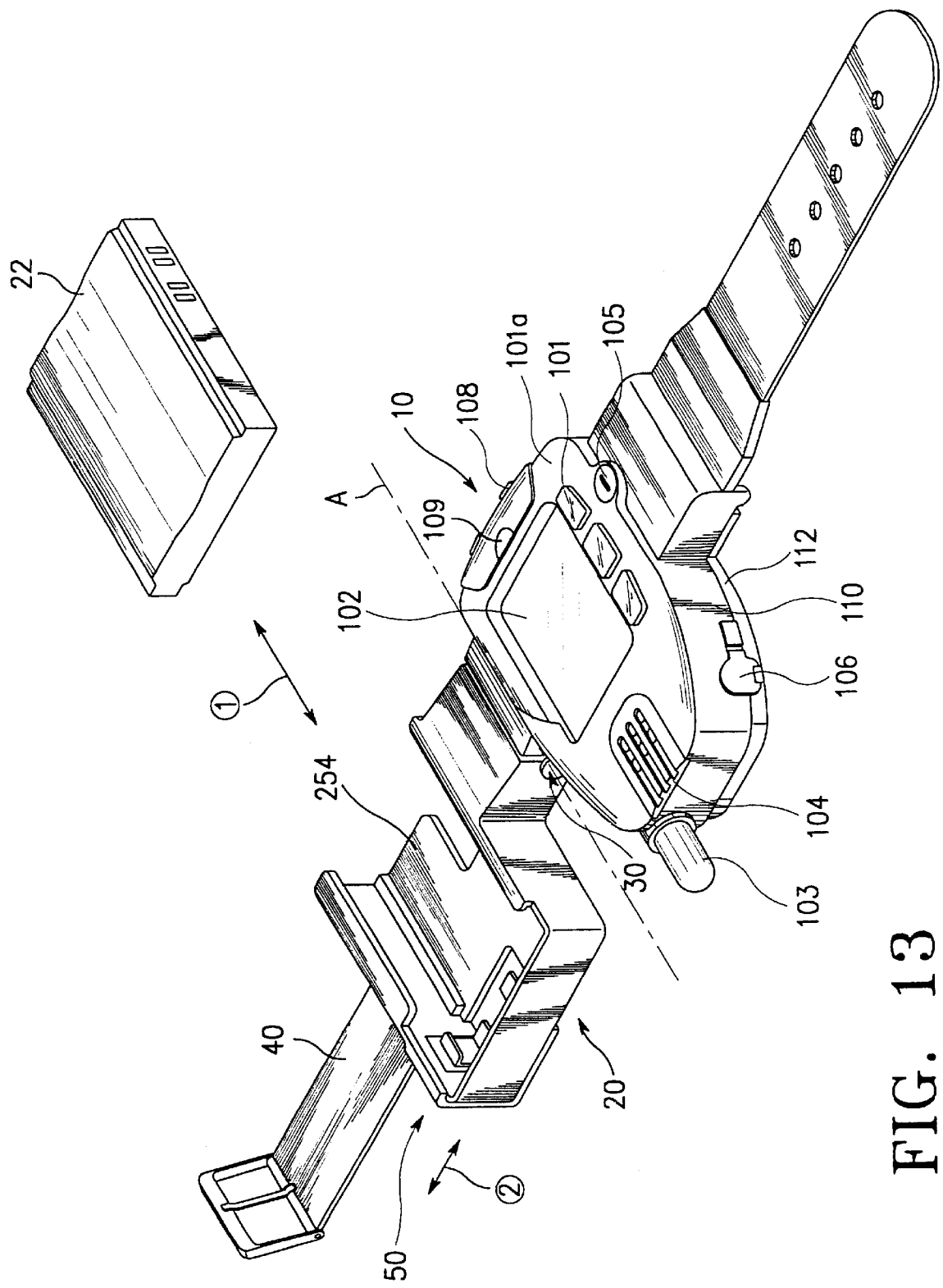
FIG. 13 is a perspective view illustrating the watch type portable radiotelephone shown in FIG. 1 with the battery pack dismounted.
Figure 14:
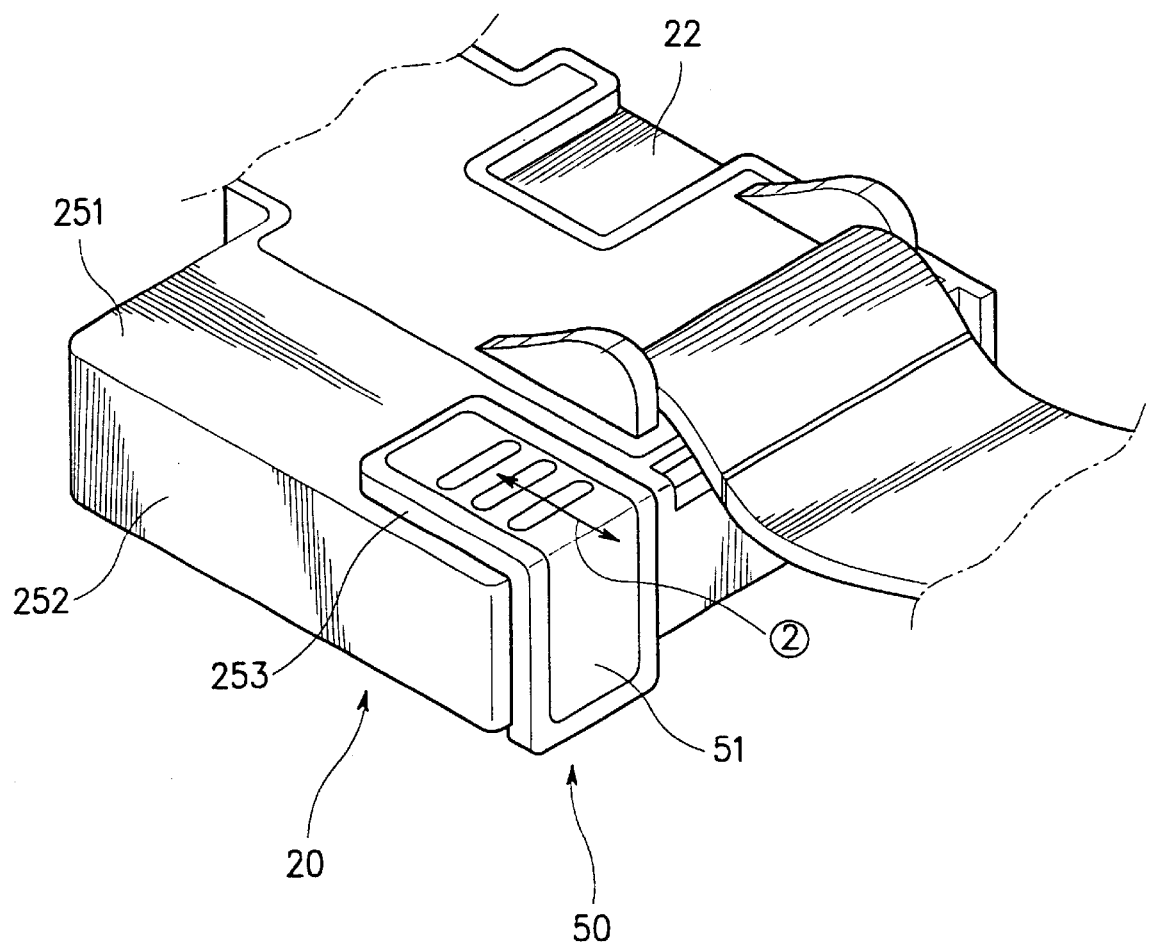
FIG. 14 is a partial perspective view illustrating battery pack locking means of the watch type portable radiotelephone shown in FIG. 1.

Locking means for locking and unlocking battery pack 22 to and from battery pack holder 20 is provided. As shown in FIGS. 13 and 14, the locking means of the present invention is mounted to a desired place on battery pack holder 20. The locking means occupies a portion of a lower end 251 and a portion of a side end 252 of battery pack holder 20. Battery pack holder 20 is formed with a projection 253 for guiding a locker 51 (FIG. 14) of the locking means in the directions indicated by the arrow ② when the locking means is installed in battery pack holder 20. As locker 51 of the locking means is moved in the directions indicated by arrow ②, battery pack 22 can be locked and unlocked to and from battery pack holder 20, respectively.

Figure 15:
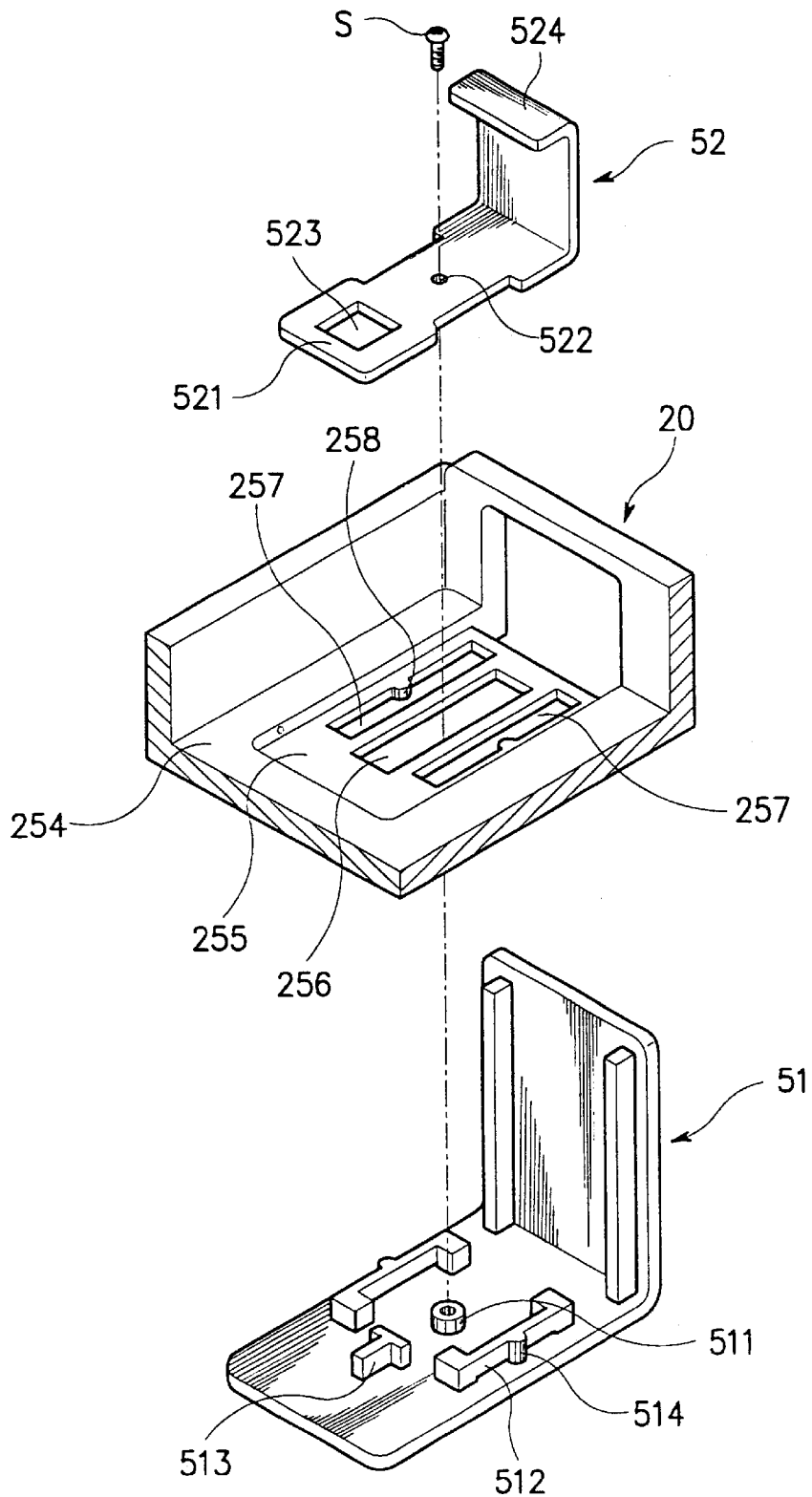
FIG. 15 is an exploded perspective view illustrating the battery pack locking means shown in FIG. 14.

Referring to FIG. 15, the battery pack locking means includes two lockers 51 and 52. One locker 51 is assembled to battery pack holder 20 from bottom to top, and the other locker, that is, a sublocker 52, is assembled to battery pack holder 20 from top to bottom. Locker 51 and sublocker 52 are coupled to each other by means of a screw S which is inserted in a vertical direction, to attach the two lockers 51 and 52 together.

Battery pack holder 20 has a recess 255 which is formed on an inner surface of bottom wall 254 of battery pack holder 20. At least one guide slot 257 for guiding movement of locker 51 and sublocker 52 is defined in recess 255. A center slot 256 is also formed in the battery pack holder 20 to allow the locker 51 and sublocker 52 to be inserted therein, thereby to guide the movement of locker 51 and sublocker 52. In the preferred embodiment of the present invention, two guide slots 257 are formed such that they are opposed to each other. Guide slots 257 function to guide locker 51 and sublocker 52 along the directions indicated by the arrow ② of FIG. 14. Further, due to the fact that a stopper protrusion 258 projects from a portion of bottom wall 254 within guide slot 257, when locker 51 is moved forward and rearward along guide slot 257, locker 51 resists impact applied to body element 10.

Locker 51 has a locking boss 511 for receiving therein screw S, and a pair of guide projections 512 are positioned about locking boss 511. The pair of guide projections 512 are arranged such that they are symmetric with each other. When locker 51 is mounted to the pack holder 20, a protrusion 513, serving as the reference of precise assembling position between locker 51 and battery pack holder 20, projects upward. Additionally, each of the pair of guide projections 512 is formed with a stopper protrusion 514 for tightening the movement of locker 51, so that the movement of locker 51 is restricted by battery pack holder 20.

Sublocker 52 is preferably made of metal. One end 521 of sublocker 52 is formed with a hole 523 through which protrusion 513 passes. A middle portion of sublocker 52 is formed with a hole 522 through which the screw S passes. The other end, that is, a locking end 524 of the sublocker 52, is bent twice and serves as a segment which is engaged into and disengaged from a locking groove 226 (see FIG. 16) defined in battery pack 22. Battery pack 22 can be locked to battery pack holder 20 by locking end 524 of the sublocker 52.

As the locker 51 is moved, sublocker 52 is moved integrally with locker 51. Accordingly, if locker 51 is forcibly pushed toward battery pack 22, battery pack 22 is maintained in a state wherein it is locked to battery pack holder 20, that is, locking end 524 of sublocker 52 is engaged in locking groove 226. On the contrary, if locker 51 is forcibly pulled away from the battery pack 22, locking end 524 of sublocker 52 is disengaged from locking groove 226 (see FIG. 16), and battery pack 22 is unlocked from battery pack holder 20.

Figure 16:
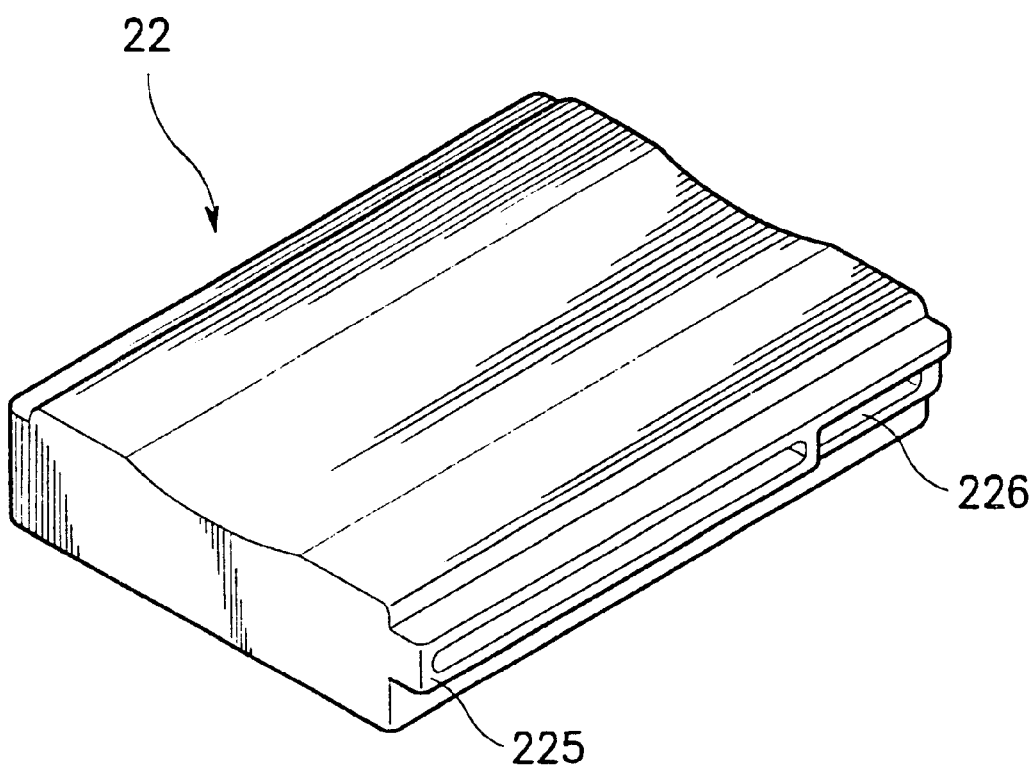
FIG. 16 is a perspective view illustrating the battery pack of the watch type portable radiotelephone shown in FIG. 1.

As shown in FIG. 16, in order to allow battery pack 22 to be locked and unlocked to and from battery pack holder 20, respectively, the side end of the battery pack 22 is formed with guide projection 225 and locking groove 226. Guide projection 225 is provided for allowing battery pack 22 to be locked and unlocked to and from battery pack holder 20, respectively, while being moved along a straight path, and locking end 254 of sublocker 52 is engaged into and disengaged from locking groove 226.

Figure 17:
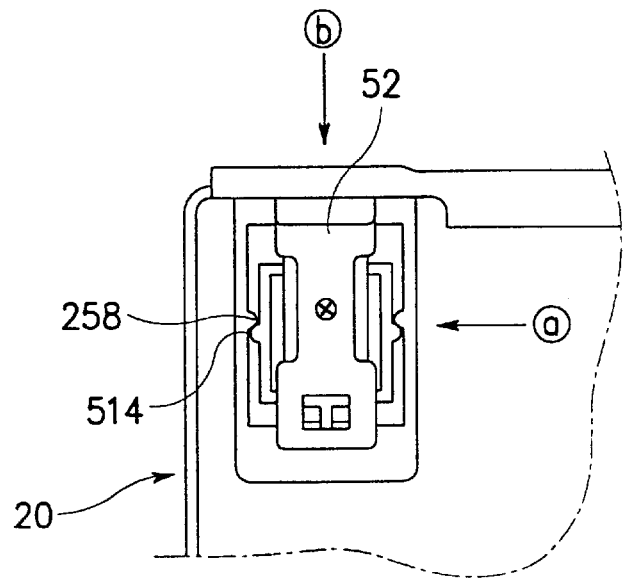
FIG. 17 is a bottom view illustrating the battery pack locking means in the position mounting the battery pack to the battery pack holder.
Figure 18:
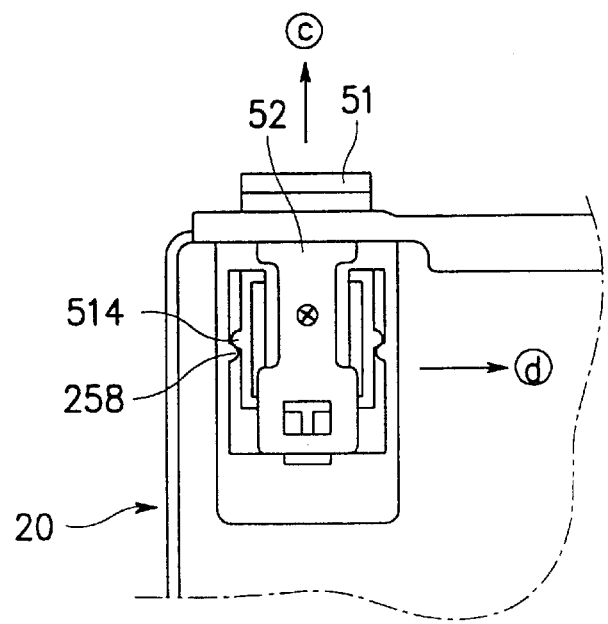
FIG. 18 is a bottom view illustrating the battery pack locking means in the position in which the battery pack is dismounted from the battery pack holder.
Figure 19:
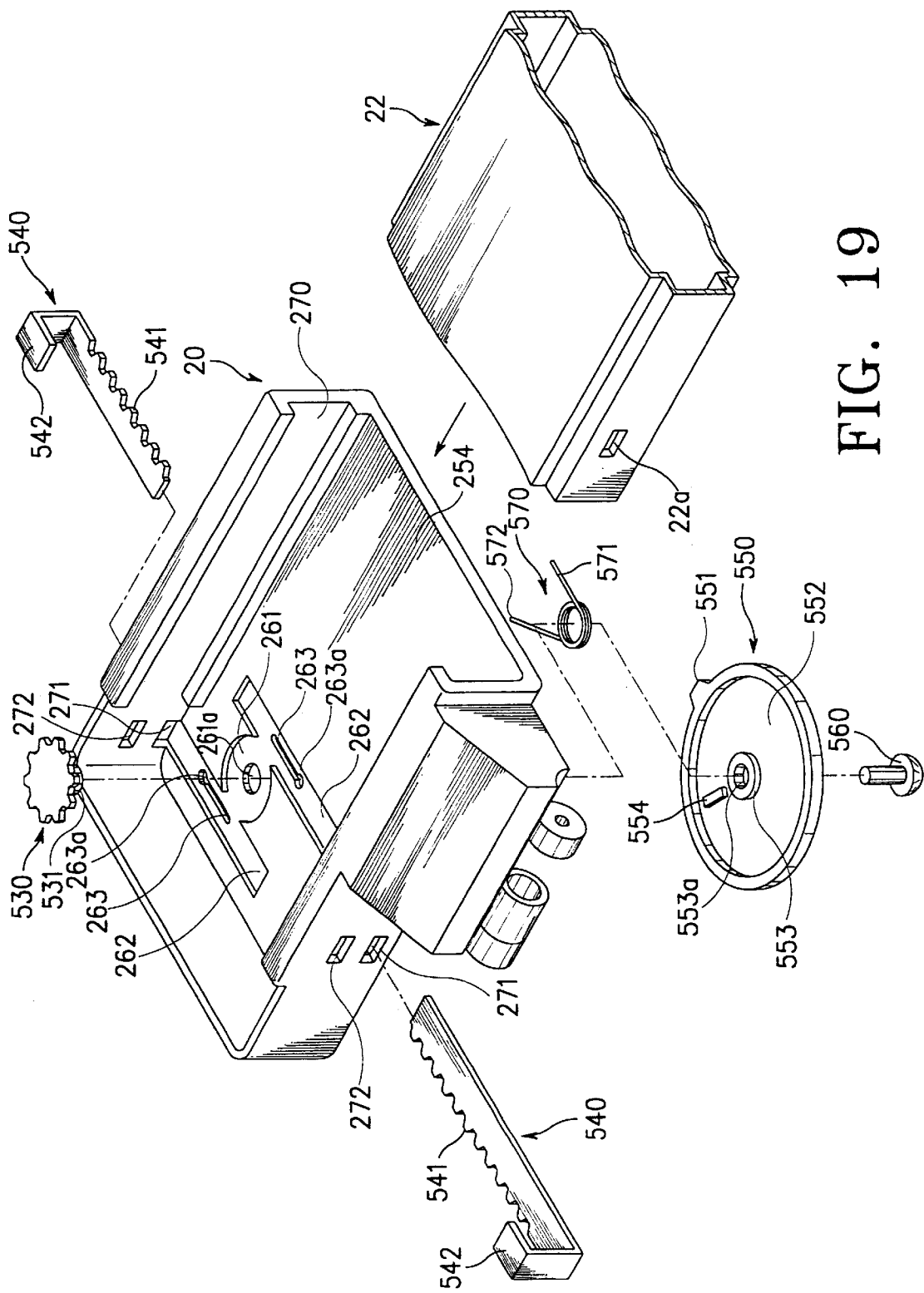
FIG. 19 is an exploded perspective view illustrating battery pack locking means of a watch type portable radiotelephone in accordance with a second preferred embodiment of the present invention.
Figure 20:
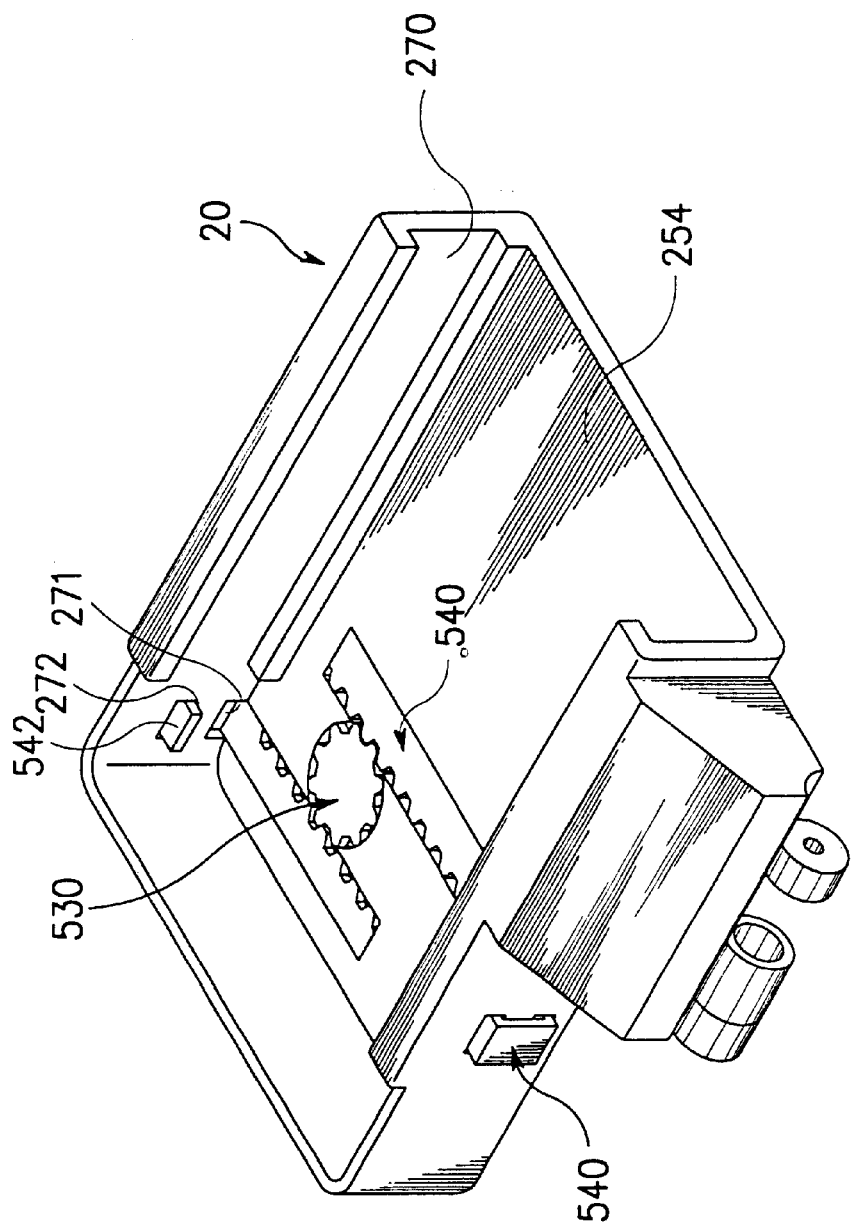
FIG. 20 is a perspective view illustrating a battery pack holder in which the battery pack locking means shown in FIG. 19 is installed.
Figure 21:
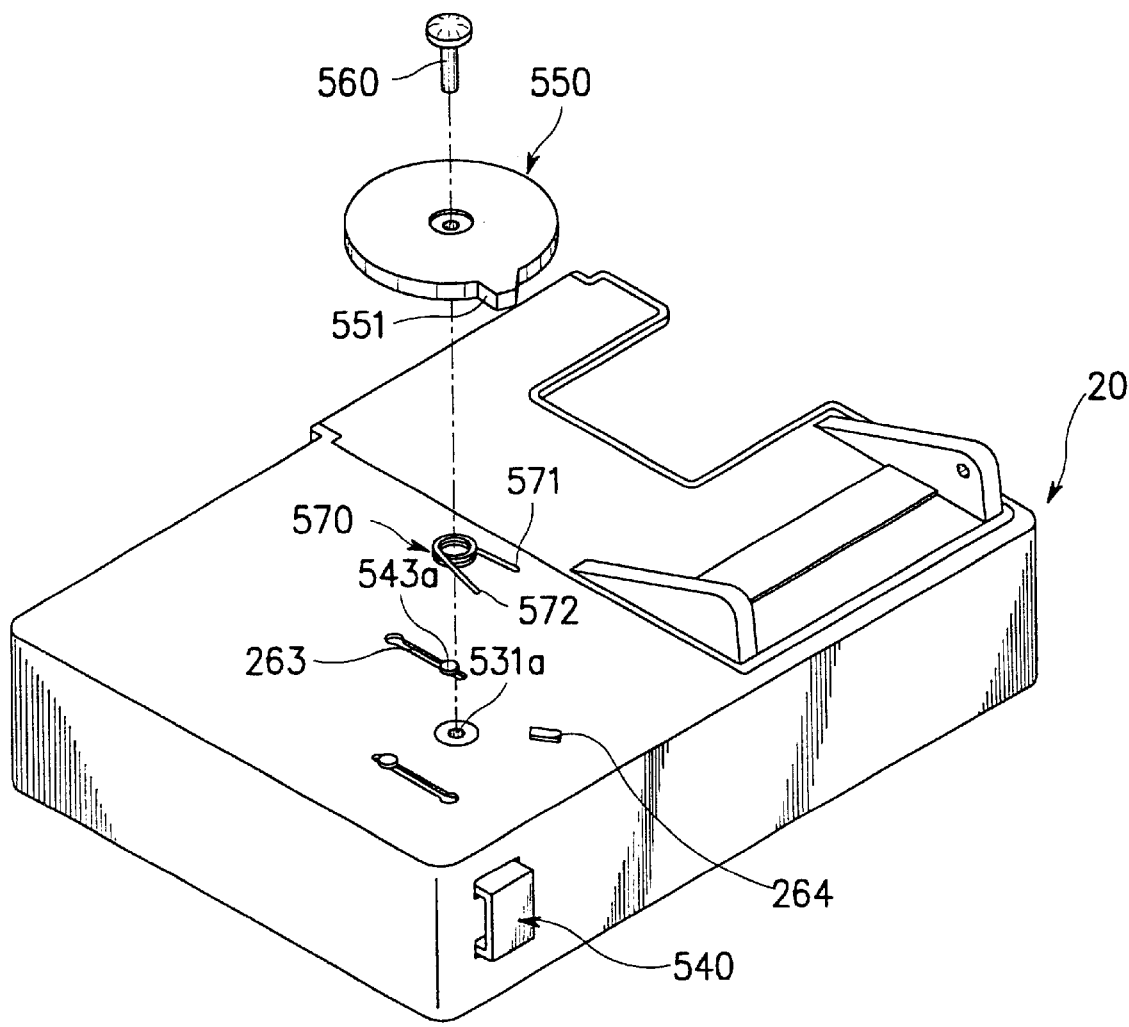
FIG. 21 is an exploded perspective view illustrating a lower surface of the battery pack holder shown in FIG. 20.
Figure 22:
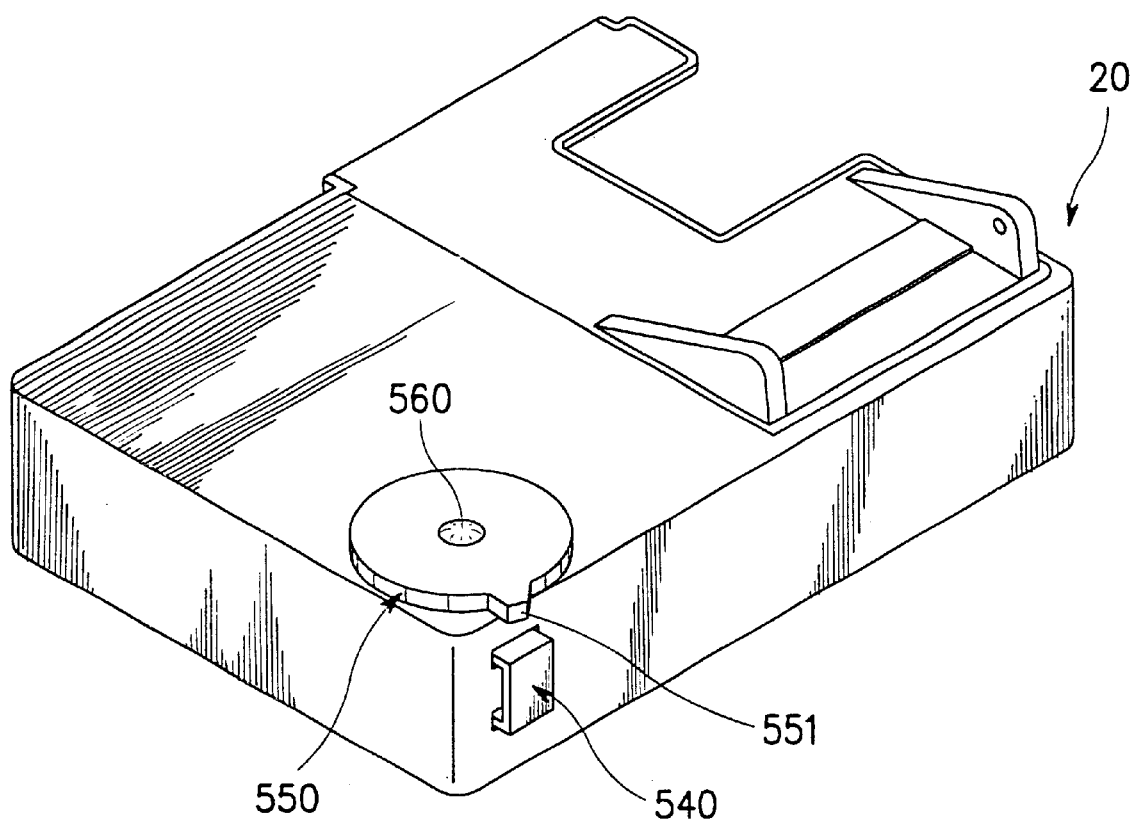
FIG. 22 is a perspective view illustrating the lower surface of the battery pack holder shown in FIG. 20.

As shown in FIG. 17, when battery pack 22 (not shown in FIG. 17) is fitted into battery pack holder 20, locker 51 is pushed in a direction indicated by arrow b, and locking end 524 is engaged into locking groove 226 to lock battery pack 22 to battery pack holder 20. As shown in FIG. 18, when locking end 524 is disengaged from locking groove 226 in a direction indicated by arrow d by pulling locker 51 in a direction indicated by an arrow c, the battery pack 22 is unlocked from battery pack holder 20.

Accordingly, the watch type portable radiotelephone according to the present invention provides advantages. For example, battery pack 20 can be repeatedly locked to and unlocked from battery pack holder 20 using locking means 50 to facilitate recharging of battery pack 22. This assures user convenience. Stopper protrusions 258 and 514 cooperate with each other to tighten and restrict movement of locker 51.

FIGS. 19–22 illustrate an alternate embodiment of the battery pack locking means. The battery pack locking means according to this embodiment of the present invention comprises a pinion gear 530, at least one locking member 540, a lever 550 and a fixing pin 560. Pinion gear 530 is rotatively seated on the inner surface of bottom wall 254 of battery pack holder 20. Each of the at least one locking members 540 has a rack gear 541 and a locking tongue 542 which are integrally formed with each other. Rack gear 541 extends from outside to inside into battery pack holder 20 through a side wall 270 of battery pack holder 20 and is meshed with pinion gear 530 to be moved forward and rearward. Locking tongue 542 is bent at one end of rack gear 541 and also extends from the outside of holder 20 into the battery pack holder 20 through side wall 270 of battery pack holder 20. Lever 550 is disposed on the outer surface of bottom wall 254 of battery pack holder 20 and has a knob portion 551 for rotating pinion gear 530 in a predetermined direction. Fixing pin 560 is passed through lever 550 and secured to a boss 531 which is formed on a lower surface of pinion gear 530 to enable pinion gear 530 to be rotated in response to operation of lever 550.

As described above, locking member 540 includes rack gear 541 which is formed with a plurality of teeth and locking tongue 542 which is bent twice at one end of rack gear 541.

A pinion gear seating surface 261 on which pinion gear 530 is to be seated, is formed on inner surface of bottom wall 254 of battery pack holder 20 on which the battery pack 22 is positioned. The lower surface of pinion gear 530 is formed with boss 531 which has a hole 531a. Boss 531 is inserted through a boss insertion hole 261a which is defined at a center portion of pinion gear seating surface 261. A rack gear guide surface 262 along which the rack gear 541 of locking member 540 is to be guided, is formed at a side of pinion gear seating surface 261.

Side wall 270 of battery pack holder 20 is formed with a guide hole 271 through which rack gear 541 of the locking member 540 passes to extend into battery pack holder 20. A through hole 272 is formed above guide hole 271 in side wall 270 of battery pack holder 20. Locking tongue 542 of locking member 540 passes through throughhole 272 to project into the inside of battery pack holder 20.

Pinion gear seating surface 261 and rack gear guide surface 262 are recessed in bottom wall 254 of battery pack holder 20. Pinion gear 530 and rack gear 541 of locking member 540 positioned within these recessed surfaces and are flush with the inner surface of bottom wall 254 of battery pack holder 20.

Figure 23:
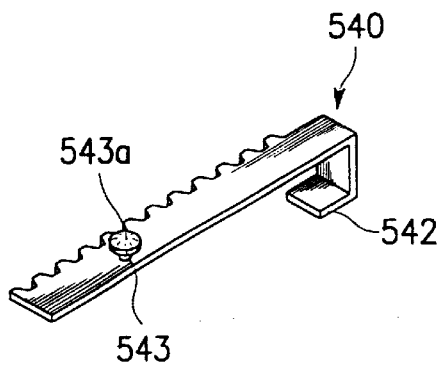
FIG. 23 is a perspective view illustrating a locking member of the battery pack locking means shown in FIG. 19.

Referring to FIG. 23, a guide pin 543 projects from a lower surface of rack gear 541 of locking member 540. A guide slit 263 (FIG. 19) having a predetermined length is defined in rack gear guide surface 262 of battery pack holder 20. Guide pin 543 is inserted into guide slit 263 to be guided therealong. In order to prevent guide pin 543 from being released from guide slit 263 when rack gear 541 of locking member 540 is guided along guide slit 263, a circular release preventing piece 543a is formed at a distal end of the guide pin 543 of the rack gear 541, and a circular hole 263a through which release preventing piece 543a passes is defined at one end of guide slit 263. The circular hole 263a is formed in a manner such that a diameter thereof is larger than a width of guide slit 263. Therefore, when guide pin 543 is guided along guide slit 263, release preventing piece 543a of the guide pin 543 prevents guide pin 543 and locking member 540 from being disengaged from guide slit 263.

Figure 24:
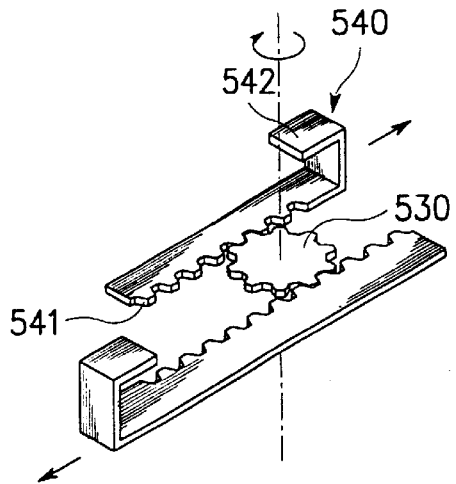
FIG. 24 is an operational view illustrating operations of a pinion gear and a pair of locking members of the watch type portable radiotelephone in accordance with the second preferred embodiment of the present invention.

Referring to FIG. 24, the locking means may include a pair of locking members 540 which are positioned opposite to each other and centered on pinion gear 530. Thus, if pinion gear 530 is rotated in a clockwise direction about its axis, the pair of locking members 540 are moved outwardly.

Lever 550, which can rotate pinion gear 530, is disposed on the outer surface of bottom wall 254 of battery pack holder 20. Lever 550 has a circular configuration and an upper surface which faces the outer surface of bottom wall 254 of battery pack holder 20. The upper surface is formed as depressed surface 552 (FIG. 19) which has a boss 553. Fixing pin 560 is positioned in hole 553a of boss 553.

Figure 25:
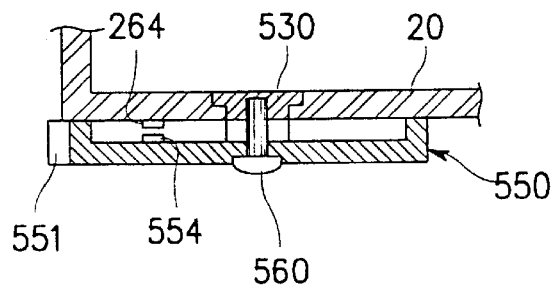
FIG. 25 is a partial cross-sectional view illustrating a state wherein the pinion gear shown in FIG. 24 and a lever are installed to the battery pack holder.

Referring to FIG. 25, after boss 531 of pinion gear 530, which is inserted through boss insertion hole 261a defined in bottom wall 254 of battery pack holder 20, and boss 553 of lever 550, which is disposed on the outer surface of bottom wall 254 of battery pack holder 20, are positioned such that they are aligned with each other, fixing pin 560 is inserted into boss 531 of pinion gear 530 through boss 553 of lever 550. Fixing pin 560 is screwed into hole 531a which is defined in boss 531 of pinion gear 530. Thus, pinion gear 530 is fixed to lever 550.

At this time, in order to maintain a state wherein locking tongue 542 of each locking member 540 is biased to project into battery pack holder 20, a biasing member, such as a torsion spring 50, is positioned between depressed surface 552 of lever 550 and the outer surface of bottom wall 254 of battery pack holder 20. Torsion spring 570 has a fixed end 571 and a free end 572. Fixed end 571 of torsion spring 570 is fixed in such a manner that it is supported by an engaging projection 264 which projects from the outer surface of bottom wall 254 of battery pack holder 20. Free end 572 of torsion spring 570 is arranged in such a manner that it is supported by another engaging projection 554 which is formed on depressed surface 552 of lever 550. Torsion spring 570 is installed to have a predetermined tension in a state wherein both ends 571 and 572 thereof are supported by the engaging projections 264 and 554, respectively.

Further, both sides of battery pack 22, which is detachably mounted to battery pack holder 20, are formed with a pair of engaging grooves 22a into which locking tongues 542 of the pair of locking members 540 project respectively.

Figure 26:
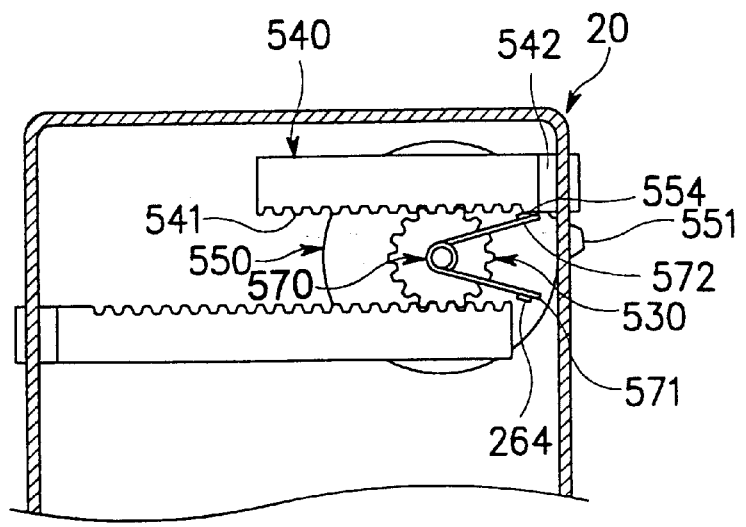
FIG. 26 is an operational view illustrating a state wherein the pair of locking members of the battery pack locking means shown in FIG. 19 are in a locking position.
Figure 27:
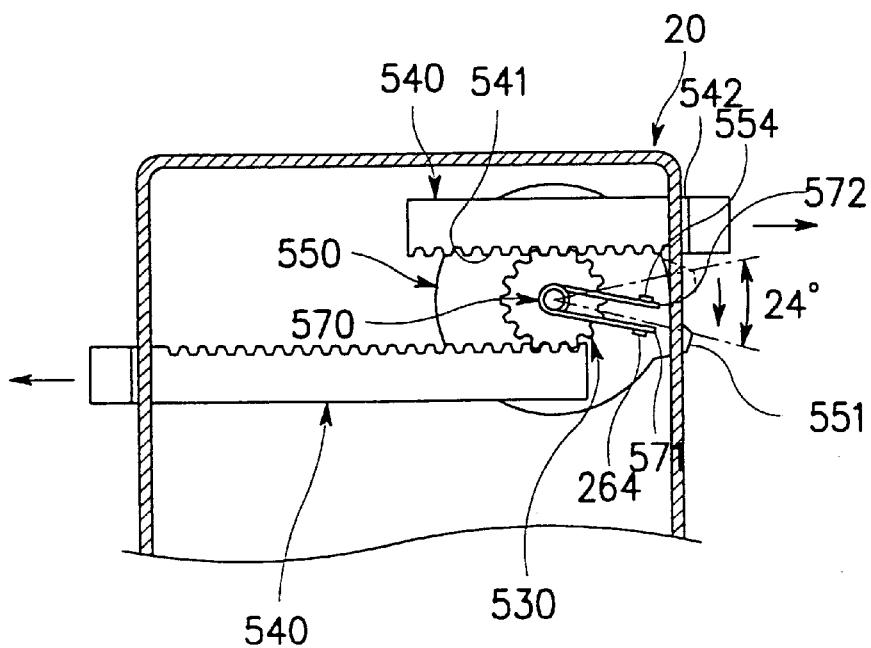
FIG. 27 is an operational view illustrating another state wherein the pair of locking members of the battery pack locking means shown in FIG. 19 is in an unlocking position.

Referring to FIGS. 26 and 27, portions of locking tongues 542 project through engaging grooves 22a into the battery pack holder 20. This state is held due to the fact that free end 572 of torsion spring 570 pushes engaging projection 554 of lever 550, with fixed end 571 of torsion spring 570 supported by engaging projection 264 of battery pack holder 20.

If knob portion 551 of lever 550 is rotated by a predetermined angle in a clockwise direction so as to mount battery pack 22 (not shown in FIGS. 26 and 27), engaging projection 554 of lever 550 lowers the free end 572 of torsion spring 570 toward fixed end 571 of torsion spring 570, which is supported by engaging projection 264 of battery pack holder 20 (see FIG. 27). At this time, torsion spring 570 has a tension which is larger than the predetermined tension in the case of FIG. 26.

When pinion gear 530 is rotated, the pair of locking members 540 which are meshed with pinion gear 530, are also rotated in a direction indicated in FIG. 27. That is to say, the rotating movement of pinion gear 530, effected by the manipulation of lever 550, is translated to linear movement of locking members 540 via rack gears 541. It is preferred that the lever 550 is rotated by 24.

In this state, after battery pack 22 is fitted into battery pack holder 20, if knob portion 551 of lever 550 is released, locking tongues 542 of locking members 540 are returned to their original positions as shown in FIG. 26 by the elastic force of torsion spring 570. Accordingly, locking tongues 542 are engaged into engaging grooves 22a, respectively, which are formed at the side surfaces of battery pack 22, thereby accomplishing locking of battery pack 22.

Figure 28:
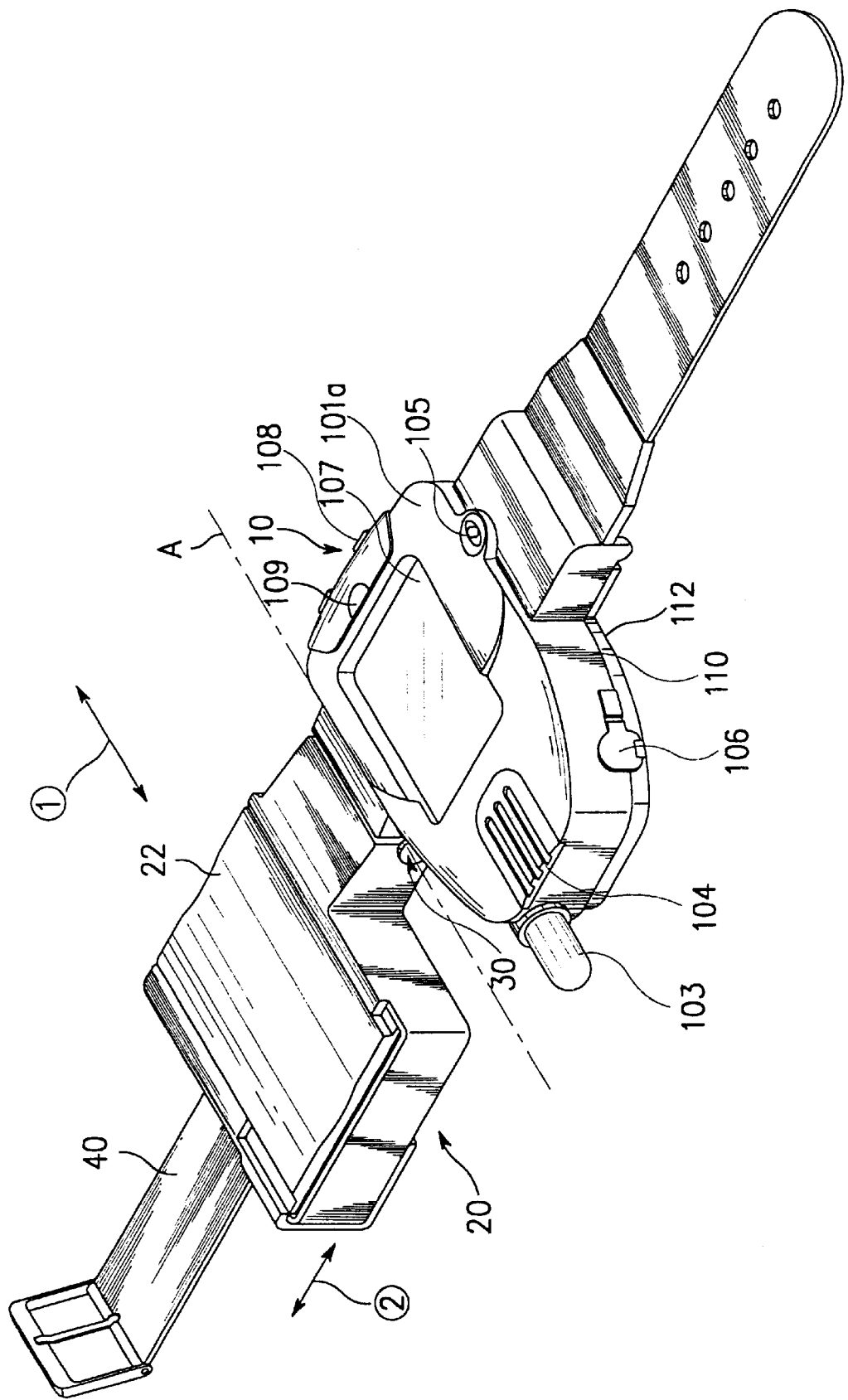
FIG. 28 is a perspective view illustrating a watch type portable radiotelephone in accordance with a third preferred embodiment of the present invention.
Figure 29:
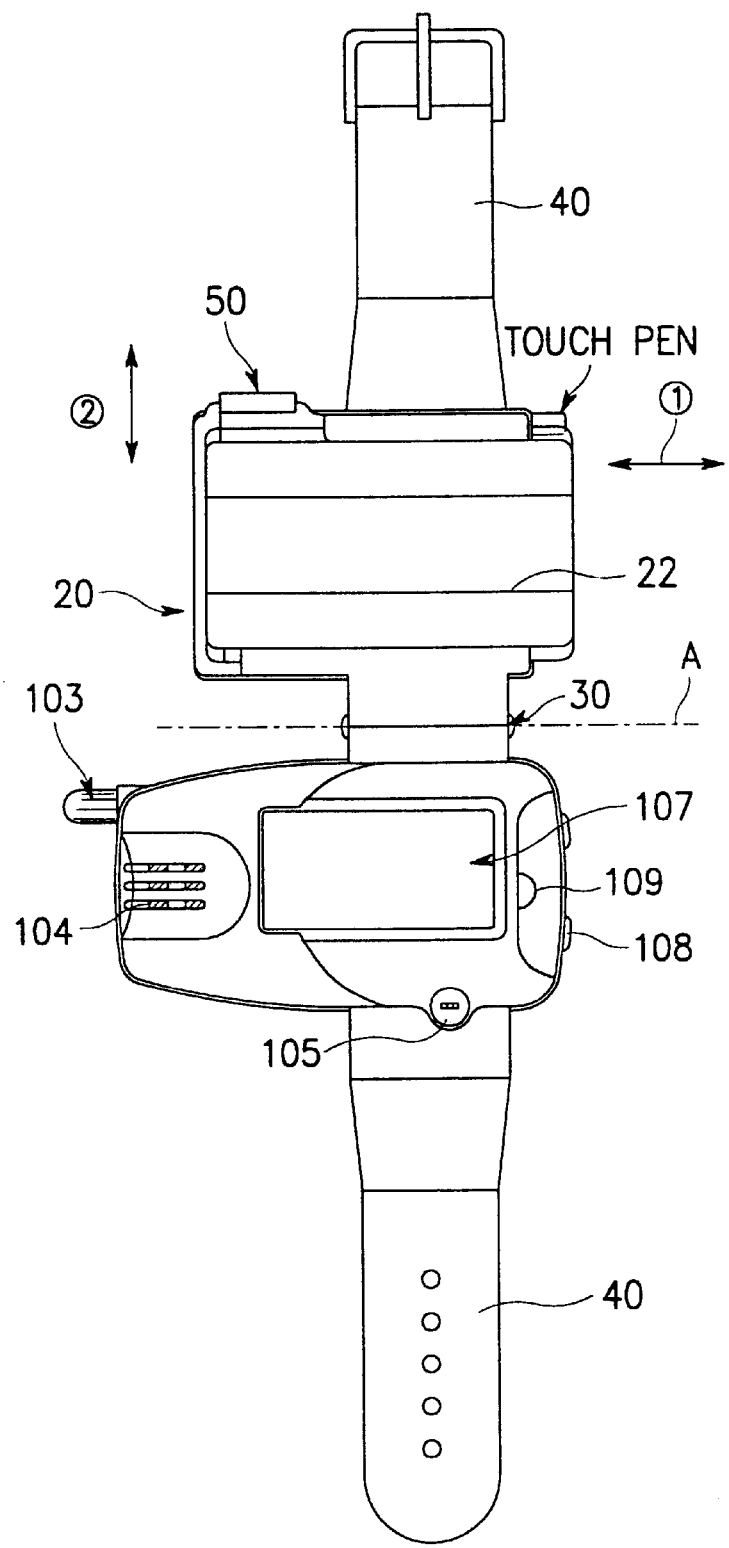
FIG. 29 is a front view illustrating the watch type portable radiotelephone shown in FIG. 28.
Figure 30:
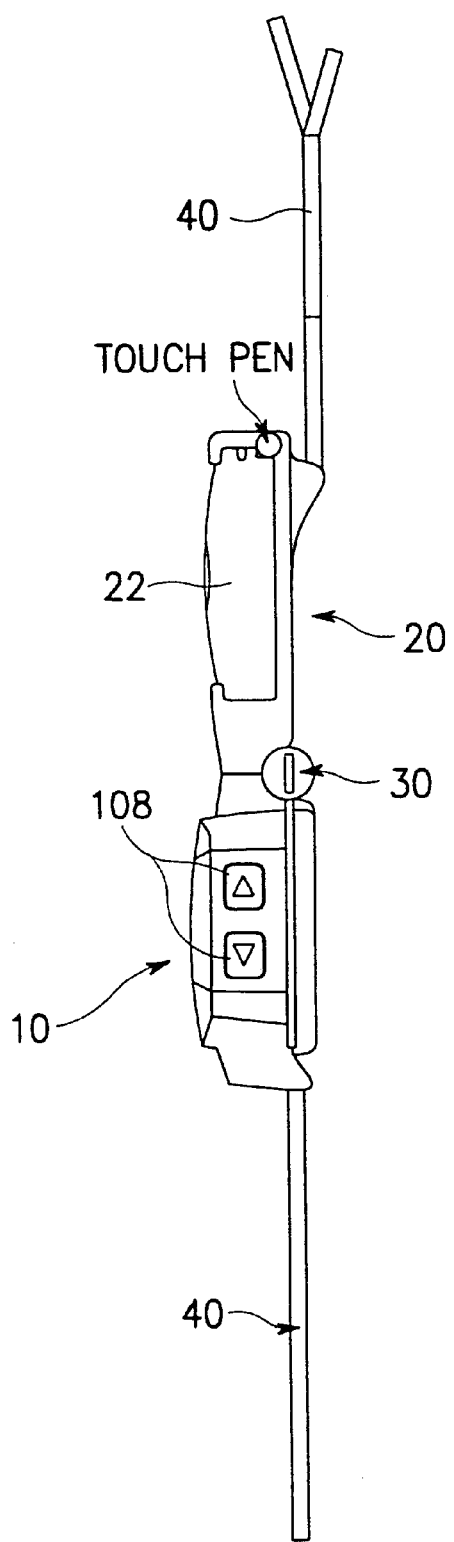
FIG. 30 is a side view illustrating the watch type portable radiotelephone shown in FIG. 28.

Referring to FIGS. 28 to 30, in the watch type portable radiotelephone according to a third embodiment of the present invention, a touch pen is used as data input means, and a touch panel 107 which is mounted to the body element is used as data output means which responds to a data input operation by the touch pen. Since other portions except the data input means and data output means have the same constructions with those of the first or second embodiments, further explanations thereof will be omitted.

In the case that the touch panel is used as the data output means, while it is explained that the data input means is limited to the touch pen, the data input means needs not to be limited to the touch pen, and data can be inputted using a mechanism which has the same functionality with the touch pen, or the finger, as occasion demands.

As described above, the watch type portable radiotelephone according to the present invention provides advantages in that portability is enhanced due to its compactness and lightweightness, whereby user convenience is ensured. Furthermore, since a battery pack is constructed such that it can be easily locked to and unlocked from a battery pack holder, user convenience is further elevated. Moreover, because terminal connection means and hinge means are constructed such that they have waterproof structures, waterproofness is ensured when the watch type portable radiotelephone is worn around the wrist.

While this invention has been described in connection with what is presently considered to be the most practical and preferred embodiments, it is to be understood that the invention is not limited to the disclosed embodiments, but, on the contrary, it is intended to cover various modifications within the spirit and scope of the appended claims.

What is claimed is:

1. A portable radiotelephone comprising:
   a body element including upper and lower case frames;
   a battery pack holder and a battery pack for supplying power to the body element, the battery pack being removably secured to the battery pack holder;
   a hinge assembly for rotatably connecting the body element to the battery pack holder;
   a wrist band connected to the body element and the battery pack holder for enabling the portable radiotelephone to be worn around the wrist; and
   a locking means comprising:
      at least one guide slot formed in a bottom wall of the battery pack holder;
      a locker positioned on the battery pack holder, the locker having at least one guide projection inserted into the guide slot to guide the locker along the guide slot along a straight path; and
      a sublocker supported by the battery pack holder and secured to the locker, the sublocker having a locking end configured to be received in a locking groove defined in the battery pack.

2. A portable radiotelephone comprising:
   a body element including data input means, an LCD unit capable of outputting data in response to a data input operation using the data input means, an antenna unit electrically connected to a receiver and a transmitter, a speaker unit, and a microphone unit;
   a battery pack holder and a battery pack removably locked thereto for supplying power to the body element;
   hinge means for rotatably connecting the body element and the battery pack holder to each other, wherein a lower cover having a predetermined contour is fastened to an outer surface of a bottom wall of the battery pack holder;
   connection means for electrically connecting the battery pack to the body element; and
   a wrist band connected to the body element and the battery pack holder for enabling the portable radiotelephone to be worn around the wrist.

3. The portable radiotelephone as claimed in claim 2, further including guide means for guiding the battery pack between locked and unlocked positions with respect to the battery pack holder.

4. The portable radiotelephone as claimed in claim 2, wherein the data input means is selected from the group consisting of at least one key and a voice recognition unit.

5. The portable radiotelephone as claimed in claim 2, wherein the hinge means comprises:
   first and second hinge arms which project from a first supporting part disposed at a side of the battery pack holder, the first and second hinge arms being spaced apart by a predetermined distance, each of the first and second hinge arms having a hinge hole;
   a third hinge arm formed at a side of a lower cover of the battery pack holder, the third hinge arm having an opening configured to guide one end of a flexible printed circuit which is electrically connected to the battery pack holder toward the body element, the third hinge arm being brought into contact at one end thereof with one end of the first hinge arm;

fourth and fifth hinge arms formed in a second supporting part disposed at a side of an upper case frame of the body element, the fourth and fifth hinge arms being in contact at their ends with ends of the first and second hinge arms, respectively, each of the fourth and fifth hinge arms having a hinge hole;

a center hinge arm secured to the upper case frame between the fourth and fifth hinge arms and having a first slit through which the flexible printed circuit passes, the center hinge arm having a hinge hole; and a hinge shaft passing through the third hinge arm and through the hinge holes which are formed in the first, second, fourth and fifth hinge arms and in the center hinge arm, the hinge shaft being retained in position via a hinge cap.

6. The portable radiotelephone as claimed in claim 5, wherein the second hinge arm of the battery pack holder is closely fitted into a first slot which is defined between the center hinge arm and the fifth hinge arm of the upper case frame of the body element.

7. The portable radiotelephone as claimed in claim 5, wherein the first hinge arm of the battery pack holder and the third hinge arm of the lower cover are closely fitted into a second slot which is defined between the fourth hinge arm and the center hinge arm of the upper case frame of the body element.

8. The portable radiotelephone as claimed in claim 5, further including a body element mounting part having a pair of second slits configured to allow passage of the flexible printed circuit and a first seating groove which is defined between the pair of second slits, the body element mounting part being formed integrally with a side of the center hinge arm; and a mounting edge portion formed in the upper case frame in a manner such that the mounting edge portion has a height smaller than that of the upper case frame of the body element, the mounting edge portion being fitted into the first seating groove of the body element mounting part.

9. The portable radiotelephone as claimed in claim 5, wherein the center hinge arm comprises an inner hinge arm portion which defines the hinge hole, and an outer housing which defines an annular space around the inner hinge arm portion, the inner hinge arm portion and the outer housing being concentrically positioned about the hinge hole in the center hinge arm.

10. The portable radiotelephone as claimed in claim 9, wherein the flexible printed circuit extends toward the body element while being detoured along the annular space which is defined between the inner hinge arm portion and the outer housing of the center hinge arm.

11. The portable radiotelephone as claimed in claim 10, wherein the flexible printed circuit is detoured in a direction where the battery pack holder is pivoted relative to the body element.

12. The portable radiotelephone as claimed in claim 2, wherein the connection means comprises:

a seating edge portion formed in a recess in a side wall of the battery pack;

a terminal holder positioned on the seating edge portion such that it is flush with an outer surface of the side wall of the battery pack, the terminal holder having a plurality of terminals;

a pair of openings formed in the side of the battery pack holder, the pair of openings being positioned to correspond to the plurality of terminals of the terminal holder; and a pair of contact spring holders installed in the pair of openings, respectively, and having a plurality of contact springs which project inside the battery pack holder through the pair of openings.

13. The portable radiotelephone as claimed in claim 12, wherein two pairs of guide ribs are formed at each of upper and lower portions of the terminal holder, a pair of guide grooves being formed at both sides of each terminal, and each pair of guide ribs of the terminal holder being tightly fitted into the pair of guide grooves of each terminal.

14. The portable radiotelephone as claimed in claim 12, wherein guide pieces are formed at both ends and at a center of the seating edge portion of the battery pack, the guide pieces projecting upward while having a thickness which is smaller than that of the side wall of the battery pack; and a pair of stepped portions formed at both ends of the terminal holder, in such a manner that the pair of stepped portions of the terminal holder can be tightly fitted between the guide pieces and the outer surface of the side wall of the battery pack.

15. The portable radiotelephone as claimed in claim 12, wherein a pair of second seating grooves having a predetermined depth extend in a longitudinal direction at sides of the pair of openings of the battery pack holder, in a manner such that ends of the pair of contact spring holders can be tightly fitted into the pair of second seating grooves.

16. The portable radiotelephone as claimed in claim 2, further comprising a locking means, which comprises:

at least one guide slot formed in a bottom wall of the battery pack holder;

a locker positioned on the battery pack holder, the locker having at least one guide projection which is inserted into the guide slot to guide the locker along the guide slot along a straight path; and a sublocker supported by the battery pack holder and secured to the locker, the sublocker having a locking end configured to be received in a locking groove defined in the battery pack.

17. The portable radiotelephone as claimed in claim 16, wherein the sublocker is made of metal.

18. The portable radiotelephone as claimed in claim 16, wherein both the locker and the sublocker are formed with a stopper protrusion.

19. The portable radiotelephone as claimed in claim 2, further comprising a locking means, which comprises:

a pinion gear rotatively seated onto an inner surface of the bottom wall of the battery pack holder;

at least one locking member having a rack gear and a locking tongue, the rack gear being positioned at least partly within the battery pack holder and being meshed with the pinion gear, the locking tongue being bent at one end of the rack gear and extending into the battery pack holder through a side wall of the battery pack holder;

a lever supported on the battery pack holder, the lever having a knob portion for rotating the pinion gear in a predetermined direction; and a fixing pin interconnecting the pinion gear and the lever to translate movement of the lever to movement of the pinion gear;

the battery pack having an engaging groove which is formed on a side surface thereof, the locking tongue of the locking member being movable into the engaging groove of the battery pack.

20. The portable radiotelephone as claimed in claim 19, wherein two locking members are installed in such a manner that they are positioned at both sides of the pinion gear, respectively.

21. The portable radiotelephone as claimed in claim 19, wherein the pinion gear and the rack gear of the locking member are seated onto a recessed pinion gear seating surface and a recessed rack gear guide surface, respectively, such that the pinion gear and the rack gear are flush with the inner surface of the bottom wall of the battery pack holder.

22. The portable radiotelephone as claimed in claim 19, wherein a guide pin projects from a lower surface of the rack gear of the locking member; and a guide slit of a predetermined length in which the guide pin is inserted to be guided along the guide slit, is defined in the rack gear guide surface of the battery pack holder.

23. The portable radiotelephone as claimed in claim 22, wherein a release preventing piece having a diameter which is larger than that of the guide pin, is formed at a distal end of the guide pin; and a circular hole having a diameter which is larger than a width of the guide slit is defined at one end of the guide slit to allow the release preventing piece to be inserted therein.

24. The portable radiotelephone as claimed in claim 19, wherein elastic means for maintaining the locking tongue of the locking member in engagement with the engaging groove of the battery pack is provided adjacent the lever.

25. The portable radiotelephone as claimed in claim 24, wherein the elastic means comprises a torsion spring having ends supported at a predetermined tension by a pair of engaging projections which are formed on the outer surface of the bottom wall of the battery pack holder and a surface of the lever facing the battery pack holder, respectively.

26. The portable radiotelephone as claimed in claim 19, wherein, the pinion gear and the locking member having the rack gear are arranged in a manner such that, when the lever is rotated approximately twenty-four degrees the locking tongue of the locking member is disengaged from the engaging groove of the battery pack.

27. A portable radiotelephone comprising:
data input means;
a body element including a touch panel capable of outputting data in response to a data input operation via the data input means, an antenna unit electrically connected to a receiver and a transmitter, a speaker unit, and a microphone unit;
a battery pack holder and a battery pack for supplying power to the body element;
a hinge assembly connecting the body element and the battery pack holder to each other;
a connector positioned to electrically connect the battery pack to the body element, wherein the connector comprises:
a seating edge portion formed in a recess in a side wall of the battery pack,
a terminal holder positioned on the seating edge portion such that it is flush with an outer surface of the side wall of the battery pack, the terminal holder having a plurality of terminals,
a pair of openings formed in the side of the battery pack holder, the pair of openings being positioned to correspond to the plurality of terminals of the terminal holder, and
a pair of contact spring holders installed in the pair of openings, respectively, and having a plurality of contact springs which project inside the battery pack holder through the pair of openings; and
a wrist band connected to the body element and the battery pack holder for enabling the portable radiotelephone to be worn around the wrist.

28. The portable radiotelephone as claimed in claim 7, wherein the data input means is selected from the group consisting of a touch pen and a voice recognition unit.

* * * * *